United States Patent
Sugawara

(10) Patent No.: US 12,316,628 B2
(45) Date of Patent: May 27, 2025

(54) COMMUNICATION APPARATUS, CONTROL METHOD, AND NON-TRANSITORY COMPUTER-READABLE STORAGE MEDIUM STORING PROGRAM

(71) Applicant: Canon Kabushiki Kaisha, Tokyo (JP)

(72) Inventor: Wahei Sugawara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 17/948,377

(22) Filed: Sep. 20, 2022

(65) Prior Publication Data

US 2023/0114101 A1    Apr. 13, 2023

(30) Foreign Application Priority Data

Sep. 30, 2021 (JP) .................................. 2021-161968

(51) Int. Cl.
*H04L 29/06* (2006.01)
*H04L 9/40* (2022.01)

(52) U.S. Cl.
CPC ............................... *H04L 63/0853* (2013.01)

(58) Field of Classification Search
None
See application file for complete search history.

(56) References Cited

U.S. PATENT DOCUMENTS

| 10,264,523 B2 | 4/2019 | Sumiuchi | |
|---|---|---|---|
| 2011/0148672 A1 | 6/2011 | Ventura | |
| 2019/0336055 A1* | 11/2019 | Shah | H04W 52/02 |
| 2019/0339784 A1* | 11/2019 | Lemay | G06F 1/3206 |

FOREIGN PATENT DOCUMENTS

| EP | 2637075 A1 * | 9/2013 | ........... G06F 1/3206 |
|---|---|---|---|
| EP | 3490285 B1 * | 8/2020 | ........... H04W 12/06 |
| GB | 2541036 A | 2/2017 | |
| JP | 2014-106835 A | 6/2014 | |

(Continued)

OTHER PUBLICATIONS

Indian Office Action issued Dec. 8, 2023 in counterpart Indian Patent Appln. No. 202244054940.

(Continued)

*Primary Examiner* — Benjamin E Lanier
(74) *Attorney, Agent, or Firm* — Venable LLP

(57) ABSTRACT

A communication apparatus comprises a shift unit configured to shift, based on a start of processing for connection between the communication apparatus and a predetermined external apparatus supporting authentication processing by a predetermined authentication method using an authentication server in a state in which the communication apparatus operates in a first state in which a processor of the communication apparatus operates at a first operating frequency, the state of the communication apparatus to a second state in which the processor of the communication apparatus operates at a second operating frequency higher than the first operating frequency; and an authentication unit configured to execute authentication by the predetermined authentication method via the predetermined external apparatus in the state in which the communication apparatus operates in the second state.

19 Claims, 18 Drawing Sheets

(56) References Cited

FOREIGN PATENT DOCUMENTS

| JP | 2016-127545 A | | 7/2016 | |
|----|---|---|---|---|
| JP | 2017010185 A | * | 1/2017 | ........... G02B 27/017 |
| KR | 101108233 B1 | | 2/2012 | |
| KR | 20180038444 A | | 4/2018 | |
| WO | 2013/118451 A | | 8/2013 | |

OTHER PUBLICATIONS

"Chapter 13: Key Management Techniques ED—Menezes A J; Van Oorschot P C; Vanstone S A", Handbook of Applied Cryptography; [CRC Press Series on Discrete Mathematics and Its Applications], CRC Press, Boca Raton, FL, US, pp. 543-590, Oct. 1996 (Oct. 1996), XP001525013, ISBN : 978-0-8493-8523-0Retrieved from the Internet:URL:http://www.cacr.math.uwaterloo.ca/hac/[retrieved on Feb. 13, 2023]* p. 549 *.

Extended European Search Report issued Feb. 22, 2023 in counterpart European Patent Appln. No. 22195771.5.

* cited by examiner

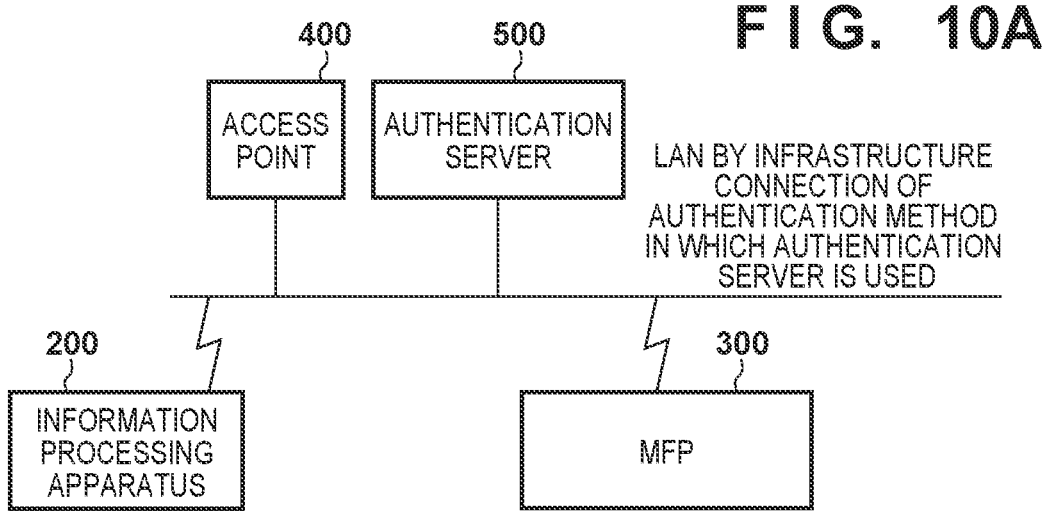
FIG. 10A
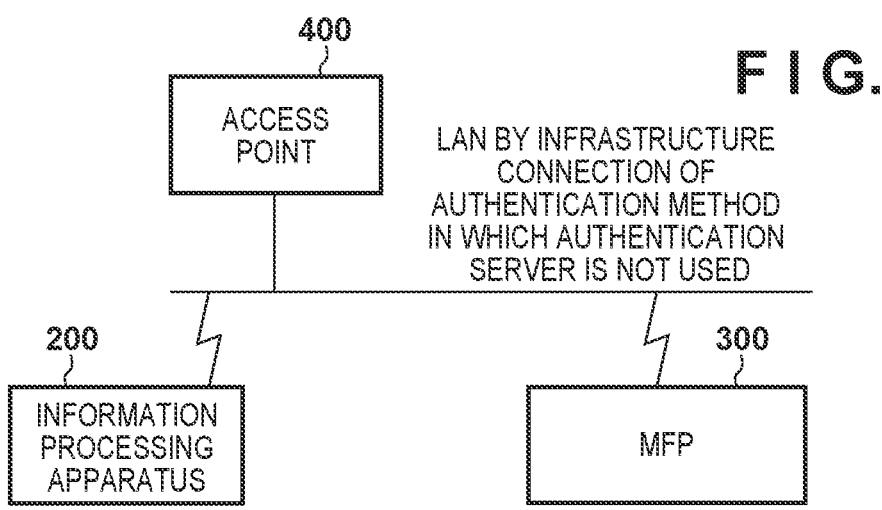
FIG. 10B
FIG. 10C
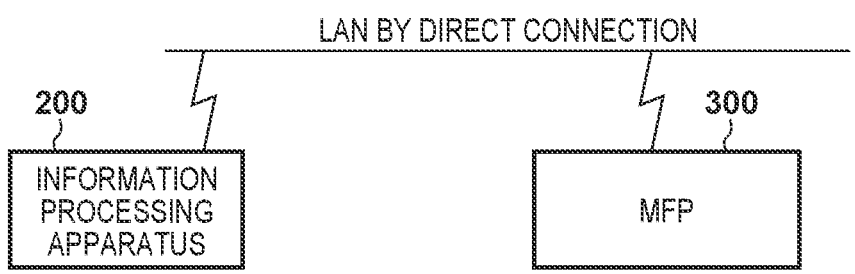

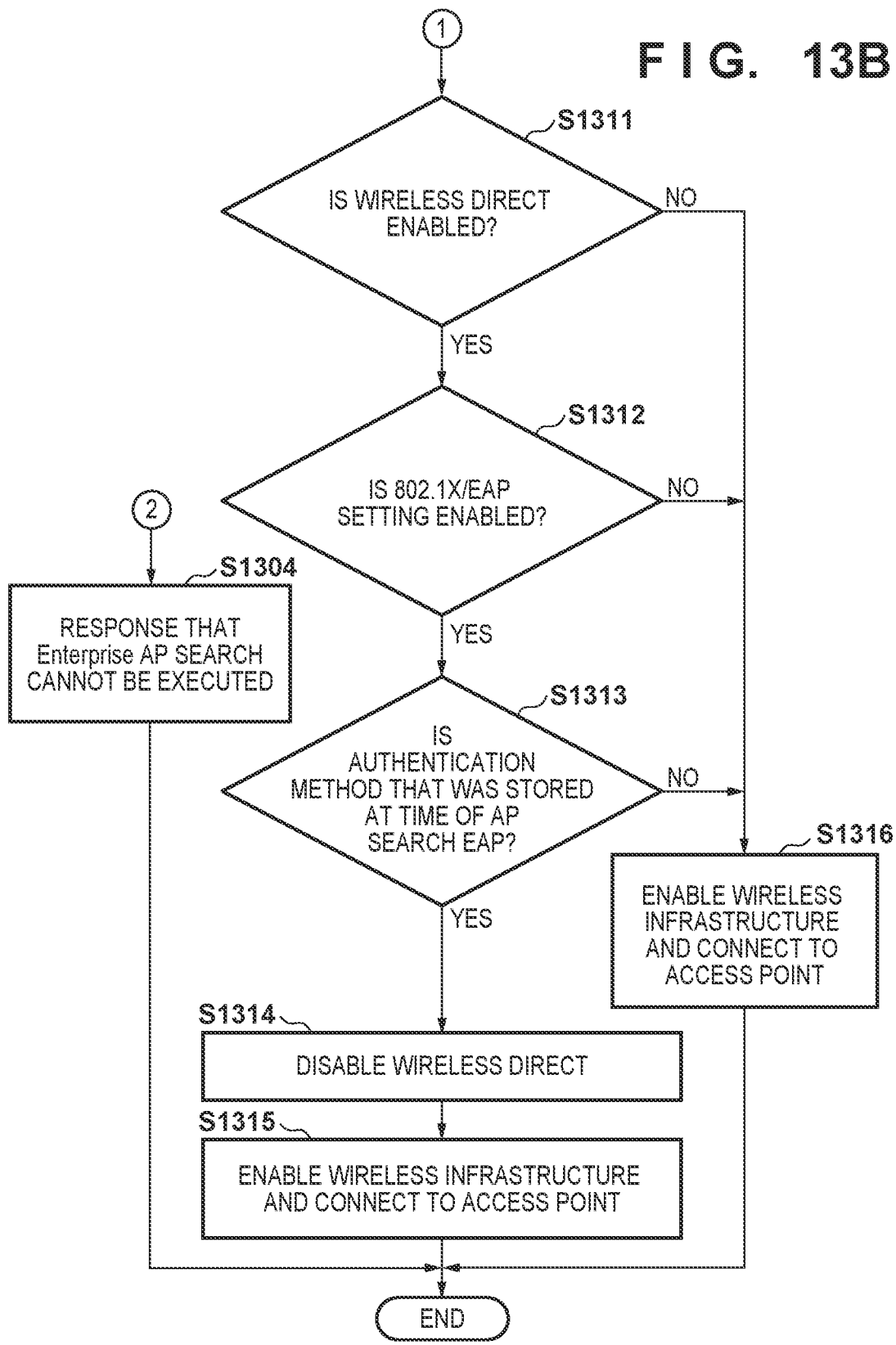

COMMUNICATION APPARATUS, CONTROL METHOD, AND NON-TRANSITORY COMPUTER-READABLE STORAGE MEDIUM STORING PROGRAM

BACKGROUND OF THE INVENTION

Field of the Invention

The present invention relates to a communication apparatus communicable with an external apparatus that requires authentication, a control method, and a non-transitory computer-readable storage medium storing a program.

Description of the Related Art

A communication apparatus may execute processing of performing for connecting to an access point existing around the self-apparatus. Japanese Patent Laid-Open No. 2016-127545 describes an information processing apparatus that searches for connectable access points, displays an SSID list, and is connected to the access point of the selected SSID. Furthermore, the communication apparatus may execute processing of reducing the clock frequency of a CPU when shifting from a normal power mode to a power saving mode. Japanese Patent Laid-Open No. 2014-106835 describes a communication apparatus that shifts, if a condition for shifting to a power saving mode is satisfied, to a different power saving mode in accordance with the state of a session.

In a wireless communication method using a wireless LAN complying with the IEEE802.11 standard, it is known that a network is protected by authenticating a communication apparatus to be connected to the network. For example, as such authentication method, an IEEE802.1X/EAP authentication method is known.

SUMMARY OF THE INVENTION

The present invention provides a communication apparatus for dynamically switching the power state of the communication apparatus in accordance with connection to an external apparatus that requires authentication, a control method, and a non-transitory computer-readable storage medium storing a program.

The present invention in one aspect provides a communication apparatus comprising: a shift unit configured to shift, based on a start of processing for connection between the communication apparatus and a predetermined external apparatus supporting authentication processing by a predetermined authentication method using an authentication server in a state in which the communication apparatus operates in a first state in which a processor of the communication apparatus operates at a first operating frequency, the state of the communication apparatus to a second state in which the processor of the communication apparatus operates at a second operating frequency higher than the first operating frequency; and an authentication unit configured to execute authentication by the predetermined authentication method via the predetermined external apparatus in the state in which the communication apparatus operates in the second state.

According to the present invention, it is possible to dynamically switch the power state of a communication apparatus in accordance with connection to an external apparatus that requires authentication.

Further features of the present invention will become apparent from the following description of exemplary embodiments with reference to the attached drawings.

BRIEF DESCRIPTION OF THE DRAWINGS

FIGS. 10A to 10C are views each for explaining a network among the apparatuses;
FIGS. 13A and 13B are flowcharts illustrating processing of connecting the MFP to the network formed by the access point.

DESCRIPTION OF THE EMBODIMENTS

Figure 1:
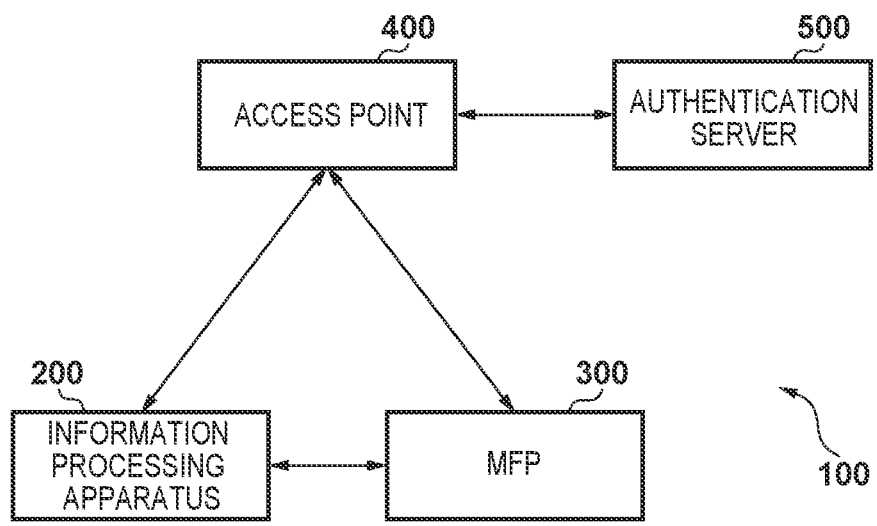
FIG. 1 is a block diagram showing a system configuration.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

If authentication processing is performed in a state in which a communication apparatus shifts from a normal power mode to a power saving mode to reduce the clock frequency of a CPU, the authentication processing may not be completed within a predetermined time, and may fail. On the other hand, if the communication apparatus is always set in the normal power mode, the power consumption increases.

According to the present disclosure, it is possible to dynamically switch the power state of the communication apparatus in accordance with connection to an external apparatus that requires authentication.

First Embodiment

FIG. 1 is a block diagram showing an example of a system configuration according to this embodiment. A communication system 100 is a communication system in which a plurality of communication apparatuses can wirelessly communicate with each other. As shown in FIG. 1, the communication system 100 includes, as the communication apparatuses, an information processing apparatus 200, an MFP (Multi Function Peripheral) 300, an access point (AP) 400, and an authentication server 500. In the communication system 100, the information processing apparatus 200 and the MFP 300 can execute, for example, processing corresponding to a print service using wireless LAN communication.

The information processing apparatus 200 is an information processing apparatus having a communication function by a wireless LAN, a wired LAN, or the like. Note that the wireless LAN will sometimes be referred to as a WLAN hereinafter. As the information processing apparatus 200, for example, a smartphone, a notebook PC, a tablet terminal, or a PDA (Personal Digital Assistant) is used.

The MFP 300 is an example of a printing apparatus having a printing function. The MFP 300 may have a reading function (scanner), a FAX function, and a telephone function. The MFP 300 has a communication function that enables wireless communication with the information processing apparatus 200. In this embodiment, the MFP 300 will be described, but an apparatus in a form different from the MFP 300 may be used. For example, a facsimile apparatus, a scanner apparatus, a projector, a portable terminal, a smartphone, a notebook PC, a tablet terminal, a PDA, a digital camera, a music reproduction device, a television, a smart speaker, AR glasses, or the like having a communication function may be used.

The access point 400 is a communication apparatus that is provided separately from (outside) the information processing apparatus 200 and the MFP 300, and operates as a base station apparatus of a WLAN. Note that the access point 400 will sometimes be referred to as the external access point 400 or external wireless base station hereinafter. A communication apparatus having a WLAN communication function can perform communication in a WLAN infrastructure mode via the access point 400. Note that the infrastructure mode will sometimes be referred to as the "wireless infrastructure mode" hereinafter. In other words, the wireless infrastructure mode is a mode in which the communication apparatus communicates the information processing apparatus 200 via the access point 400 to which the communication apparatus is connected. The access point 400 communicates with a communication apparatus (an authenticated communication apparatus) that is permitted to connect with the self-apparatus, and relays wireless communication between the communication apparatus and another communication apparatus. The access point 400 is connected to a wired LAN communication network to relay communication between a communication apparatus connected to the network and another communication apparatus wirelessly connected to the access point 400. If the authentication method of a network formed by the access point 400 is a method using an authentication server (if the access point 400 supports an authentication method using an authentication server), the access point 400 performs access control by authenticating, in cooperation with the authentication server 500, a communication apparatus to be connected to the network. A communication apparatus to be connected to the network formed by the access point 400 cannot communicate with an apparatus other than the authentication server 500 until it is authenticated. Note that the access point 400 may support an authentication method not using the authentication server. The authentication method using the authentication server and the authentication method not using the authentication server will be described in detail later.

The authentication server 500 is a communication apparatus that is provided separately from (outside) the information processing apparatus 200, the MFP 300, and the access point 400, and operates as an authentication server for comprehensively managing authentication information. The authentication server 500 authenticates, in cooperation with the access point 400, a terminal to be authenticated, and performs access control of the terminal based on an authentication result. The authentication server 500 is configured to execute authentication processing complying with, for example, the IEEE802.1X standard.

The access point 400 corresponds to an authenticator in IEEE802.1X. Furthermore, the information processing apparatus 200 and the MFP 300 correspond to supplicants in IEEE802.1X. Note that the authentication server will sometimes be referred to as the "RADIUS server" hereinafter.

The authentication server 500 performs authentication by, for example, the EAP-TLS method, the EAP-TTLS method, or the PEAP method in the IEEE802.1X standard. The EAP-TLS (EAP-Transport Layer Security) method is an authentication method using the TLS handshake protocol, and performs authentication using a server certificate and a client certificate. The EAP-TTLS (EAP-Tunneled TLS) method is an authentication method using the TLS handshake protocol, and performs authentication using a server certificate, a user name, and a password. In the PEAP (Protected EAP) method, authentication is performed using a user name and a password. Note that the information used for IEEE802.1X authentication will sometimes collectively be referred to as "authentication information" hereinafter.

The information processing apparatus 200 and the MFP 300 can execute wireless communication in a peer-to-peer mode without intervention of the external access point 400 or in the wireless infrastructure mode via the external access point 400 using their WLAN communication functions. Note that the peer-to-peer mode will sometimes be referred to as the "P2P mode" or the "wireless direct mode" in contrast to the wireless infrastructure mode hereinafter. In other words, the P2P mode is a mode in which the communication apparatus directly communicates with the information processing apparatus 200 without intervention of the access point 400. The P2P mode includes a Wi-Fi Direct® mode and a software access point (software AP) mode. Note that the Wi-Fi Direct® mode will sometimes be referred to as the WFD mode hereinafter. That is, the wireless direct mode can be said as a communication mode complying with the IEEE802.11 series.

Figure 2:
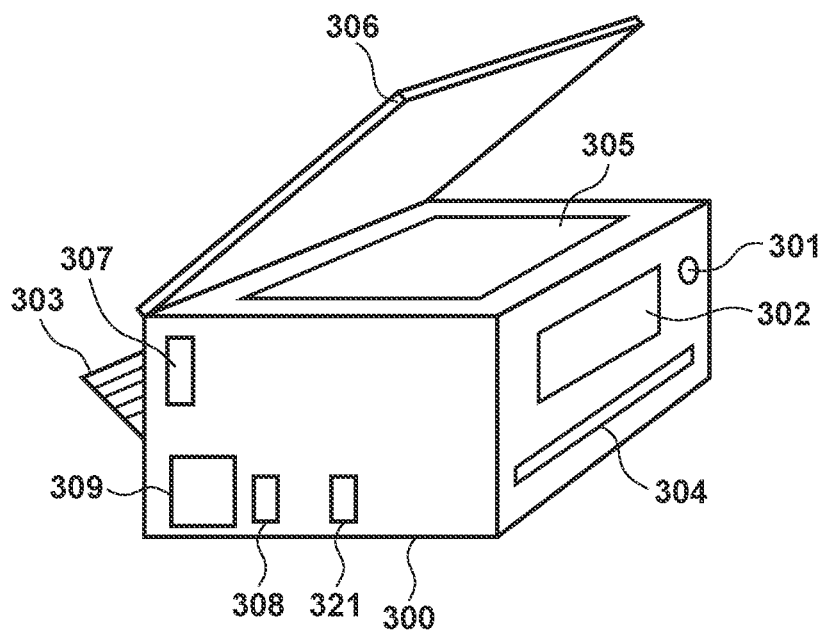
FIG. 2 is a view showing the outer appearance of an MFP.

FIG. 2 is a view showing an example of the outer appearance of the MFP 300. A power button 301 is a hard key used by the user to turn on and off the power. An operation display unit 302 includes a display and buttons used by the user to operate the MFP 300. The operation display unit 302 includes keys such as character input keys, cursor keys, an enter key, and a cancel key, an LED (Light Emitting Diode), and an LCD (Liquid Crystal Display). The operation display unit 302 is configured to accept a user operation input when, for example, activating each function of the MFP 300 or changing various settings. The operation display unit 302 may be formed by including a touch panel display.

A print sheet insertion port 303 is an insertion port at which sheets of various sizes can be set. Sheets set at the print sheet insertion port 303 are conveyed one by one to a printing unit, undergo desired printing, and are discharged from a print sheet discharge port 304. A document table 305 is a transparent glass table and is used to read a set document by the scanner. A document cover 306 is a cover for pressing a document against the document table so as not to float when reading the document by the scanner, and preventing external light from entering the scanner unit.

The MFP 300 has a function of communicating by the WLAN or wired LAN, and includes a wired communication unit 321 and a wireless communication unit 307 with an antenna and the like for wireless communication. Note that the wireless communication unit 307 and the wired communication unit 321 need not always be arranged to be visually recognized from the outside. A USB communication unit 308 includes a USB connector and a circuit for performing, by the MFP 300, communication with the external information processing apparatus 200 or the like by USB connection. A power supply unit 309 is connected to an external power supply to supply power to the MFP 300.

Figure 3:
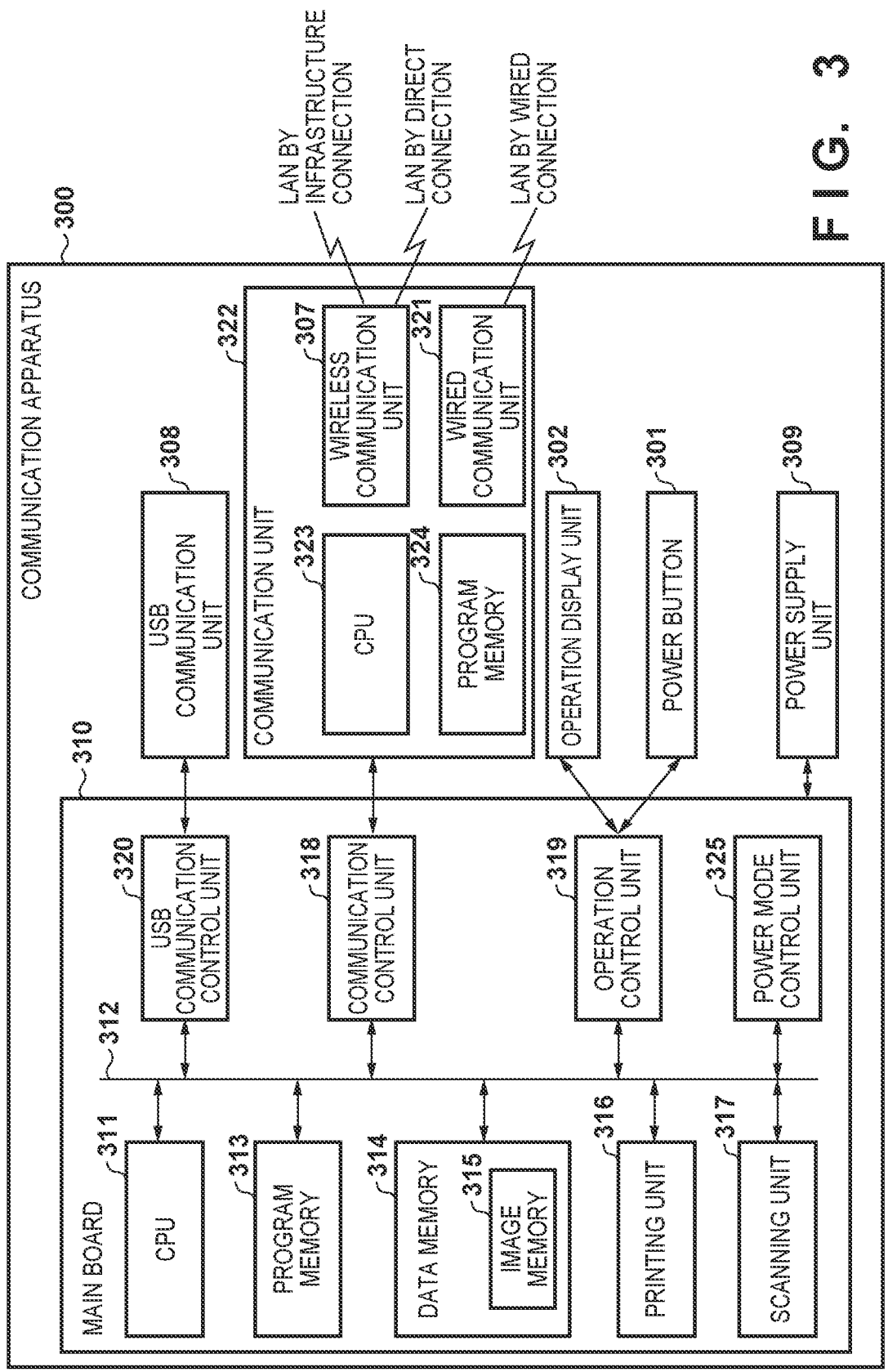
FIG. 3 is a block diagram showing the arrangement of the MFP.

FIG. 3 is a block diagram showing an example of the arrangement of the MFP 300. The MFP 300 includes a main board 310 that controls the overall apparatus, the power button 301, the operation display unit 302, a communication unit 322, the USB communication unit 308, and the power supply unit 309.

The main board 310 includes a CPU 311 in the form of a microprocessor. The CPU 311 controls the MFP 300 in accordance with control programs stored in a program memory 313 in the form of a ROM connected via an internal bus 312 and contents stored in a data memory 314 in the form of a RAM. The operation of the MFP 300 described in this embodiment is implemented when, for example, the CPU 311 reads out the programs stored in the program memory 313 and executes them. The CPU 311 controls a scanning unit 317 to read a document and store read data in an image memory 315 in the data memory 314. The CPU 311 controls a printing unit 316 to print, on a print medium, the image of the read data stored in the image memory 315 in the data memory 314. The CPU 311 controls the USB communication unit 308 via a USB communication control unit 320 to perform USB communication with the external information processing apparatus 200 by USB connection. The CPU 311 controls an operation control unit 319 to accept operation information from the operation display unit 302 or the power button 301. The CPU 311 controls the operation control unit 319 to display, for example, the state of the MFP 300 or a function selection menu on the operation display unit 302. The CPU 311 controls the wireless communication unit 307 and the wired communication unit 321 in the communication unit 322 via a communication control unit 318 in accordance with the operation information accepted by the operation display unit 302. For example, the CPU 311 changes the setting of the communication method and sets connection to the network in accordance with the operation information. The CPU 311 controls a power mode control unit 325 to switch the power mode of the MFP 300. The power mode switching operation will be described later.

The wireless communication unit 307 is a unit configured to provide the WLAN communication function. That is, the wireless communication unit 307 converts data into packets and transmits the packets to another communication apparatus in accordance with the WLAN standard. The wireless communication unit 307 also reconstructs, to original data, packets from another external communication apparatus, and outputs the data to the CPU 311. The wireless communication unit 307 is configured to be capable of executing data (packet) communication in a WLAN system complying with the IEEE802.11 standard series (IEEE802.11a/b/g/n/ac/ax and the like). However, the present invention is not limited to this, and the wireless communication unit 307 may be configured to execute communication in a WLAN system complying with another standard. Note that in this embodiment, the wireless communication unit 307 can perform communication in both the 2.4- and 5-GHz frequency bands. In addition, the wireless communication unit 307 can execute communication in the WFD mode, communication in the software AP mode, communication in the wireless infrastructure mode, and the like. The operations in these modes will be described later. Note that the information processing apparatus 200 and the MFP 300 can perform wireless communication based on the WFD mode, and the wireless communication unit 307 has a software AP function or a group owner function. That is, the wireless communication unit 307 can create a communication network in the P2P mode, and decide a channel to be used for communication in the P2P mode.

The wired communication unit 321 is a unit for performing wired communication. For example, the wired communication unit 321 can perform data (packet) communication in a wired LAN (Ethernet) system complying with the IEEE802.3 series. Furthermore, in wired communication using the wired communication unit 321, it is possible to perform communication in a wired communication mode. The wired communication unit 321 is connected to the main board 310 via the bus cable or the like.

The communication unit 322 is a unit that can provide a WLAN or wired LAN communication function, and includes the wireless communication unit 307 and the wired communication unit 321. The communication unit 322 performs encryption processing and decryption processing which are executed in authentication processing when performing connection to the access point 400. For example, when performing authentication processing by the WPA2-PSK method, the communication unit 322 performs encryption processing and decryption processing in 4-way Handshake. When performing IEEE802.1X/EAP authentication processing, the communication unit 322 performs encryption processing and decryption processing by RSA encryption or ECC (Elliptic Curve Cryptography) encryption in TLS handshake. Furthermore, the communication unit 322 performs, for communication between the MFP 300 and the access point 400, encryption processing and decryption processing using the common key cryptosystem. As shown in FIG. 3, the communication unit 322 includes a CPU 323 and a program memory 324 which are dedicated for the communication unit 322, in addition to the CPU 311 and the program memory 313. Note that if the CPU 311 and the program memory 313 also operate as the CPU 323 and the program memory 324, respectively, the CPU 323 and the program memory 324 need not be provided.

Figure 4A:
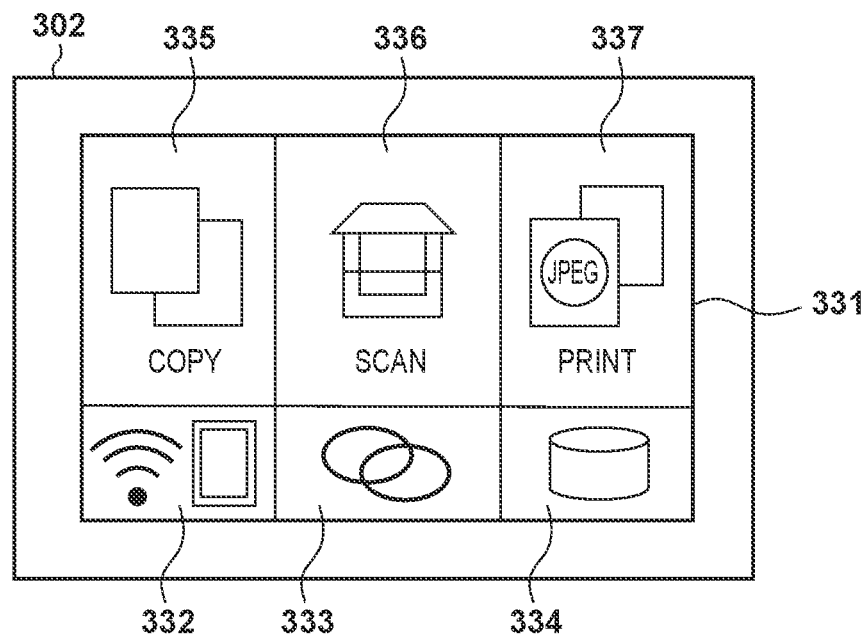
FIGS. 4A to 4C are views each schematically showing the arrangement of the operation display unit of the MFP.
Figure 4B:
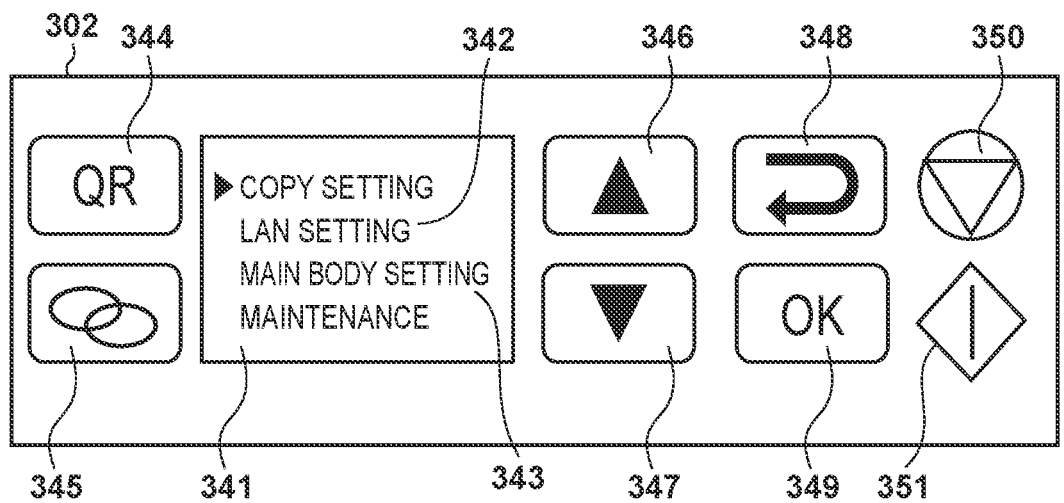
Figure 4C:
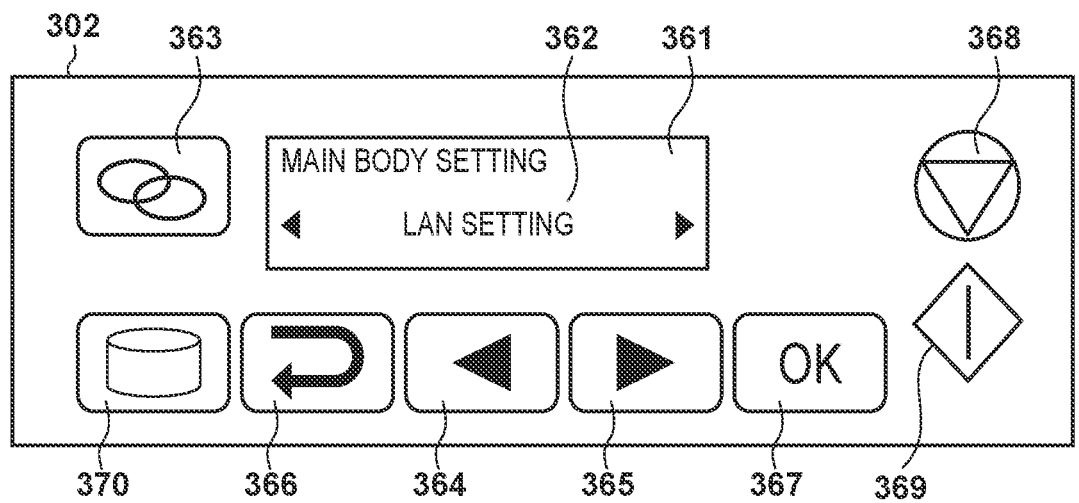

FIGS. 4A to 4C are views each schematically showing an example of the arrangement of the operation display unit 302 of the MFP 300. FIG. 4A shows an example in a case in which a touch panel display 331 forms the operation display unit 302. When the user presses the power button 301, the MFP 300 is powered on. After the MFP 300 is powered on, the MFP 300 operates in the normal power mode (to be described later), and a home screen as the top layer of a menu operable by the user is displayed on the touch panel display 331. The home screen includes a copy region 335 for accepting a copy processing execution instruction, a scan region 336 for accepting a scan processing execution instruction, and a print region 337 for accepting a print processing execution instruction. The home screen further includes a state display region 332 indicating the settings and connection states of connection in the wireless infrastructure mode and connection in the wireless direct mode of the MFP 300. In addition, the home screen includes a connection setting mode region 333 in which the user starts an operation in the connection setting mode at an arbitrary timing, and a setting region 334 in which the user can change various settings.

FIG. 4B shows an example in a case in which a relatively small LCD display 341 and various hard keys 344 to 351 form the operation display unit 302. If the user presses the power button 301, the MFP 300 is powered on. After the MFP 300 is powered on, a home screen as the top layer of a menu operable by the user is displayed on the LCD display 341. The user can operate a cursor displayed on the LCD display 341 by pressing the cursor move button 346 or 347. If the user wants to execute the operation, he/she presses the OK button 349. If the user wants to return to an immediately preceding menu screen, he/she presses the return button 348. If the user presses the QR button 344, a QR Code including information necessary for direct connection to the MFP 300 is displayed. If the displayed QR Code® is read from the information processing apparatus 200, the information processing apparatus 200 and the MFP 300 can directly be connected to perform wireless communication. If the user presses the connection setting mode button 345, the connection setting mode can be started. In the connection setting mode, by transmitting connection information from the information processing apparatus 200 to the MFP 300, the MFP 300 can be connected to the access point 400. If the user presses the stop button 350 while the MFP 300 executes a respective process, the process is canceled. If the user presses the copy start button 351, a document set on the document table 305 is scanned to execute printing.

FIG. 4C shows an example in a case in which a relatively small LCD display 361 and various hard keys 363 to 370 form the operation display unit 302. If the user presses the power button 301, the MFP 300 is powered on. After the MFP 300 is powered on, a home screen as the top layer of a menu operable by the user is displayed on the LCD display 361. By pressing the move button 364 or 365, the user can operate an item displayed on the LCD display 361. If the user wants to execute the operation, he/she presses the OK button 367. If the user wants to return to an immediately preceding menu screen, he/she presses the return button 366. If the user presses the connection setting mode button 363, the connection setting mode can be started. In the connection setting mode, by transmitting connection information from the information processing apparatus 200 to the MFP 300, the MFP 300 can be connected to the access point 400. If the user presses the stop button 368 while the MFP 300 executes each processing, the processing is canceled. If the suer presses the copy start button 369, a document set on the document table 305 is scanned to execute printing. If the user presses the setting button 370, he/she can change the various settings.

Figure 5:
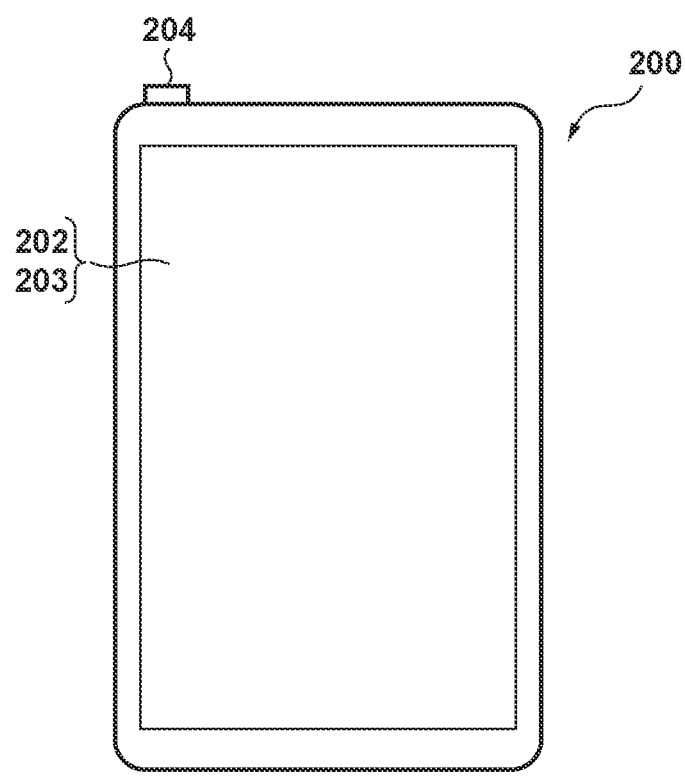
FIG. 5 is a view showing the outer appearance of an information processing apparatus.

FIG. 5 is a view showing an example of the outer appearance of the information processing apparatus 200. This embodiment will exemplify a case in which the information processing apparatus 200 is a smartphone (portable terminal) in a general form. Note that the information processing apparatus 200 includes, for example, a display unit 202, an operation unit 203, and a power key 204. The display unit 202 is, for example, a display including an LCD (Liquid Crystal Display) type display mechanism. Note that the display unit 202 may display information using an LED (Light Emitting Diode) or the like. Furthermore, the information processing apparatus 200 may have a loudspeaker function of outputting information by audio in addition to or instead of the display unit 202. The operation unit 203 includes hard keys such as keys and buttons or a touch panel to detect a user operation. Note that in this embodiment, the display unit 202 and the operation unit 203 are implemented by a single device to display information on the display unit 202 and accept a user operation by the operation unit 203 using a common touch panel display. In this case, for example, button icons and a software keyboard are displayed using the display function of the display unit 202, and touch operations of the user for them are detected by the operation acceptance function of the operation unit 203. Note that the display unit 202 and the operation unit 203 may be separated and a display hardware component and an operation acceptance hardware component may individually be configured. The power key 204 is a hard key for accepting a user operation of turning on or off the power of the information processing apparatus 200.

Figure 6:
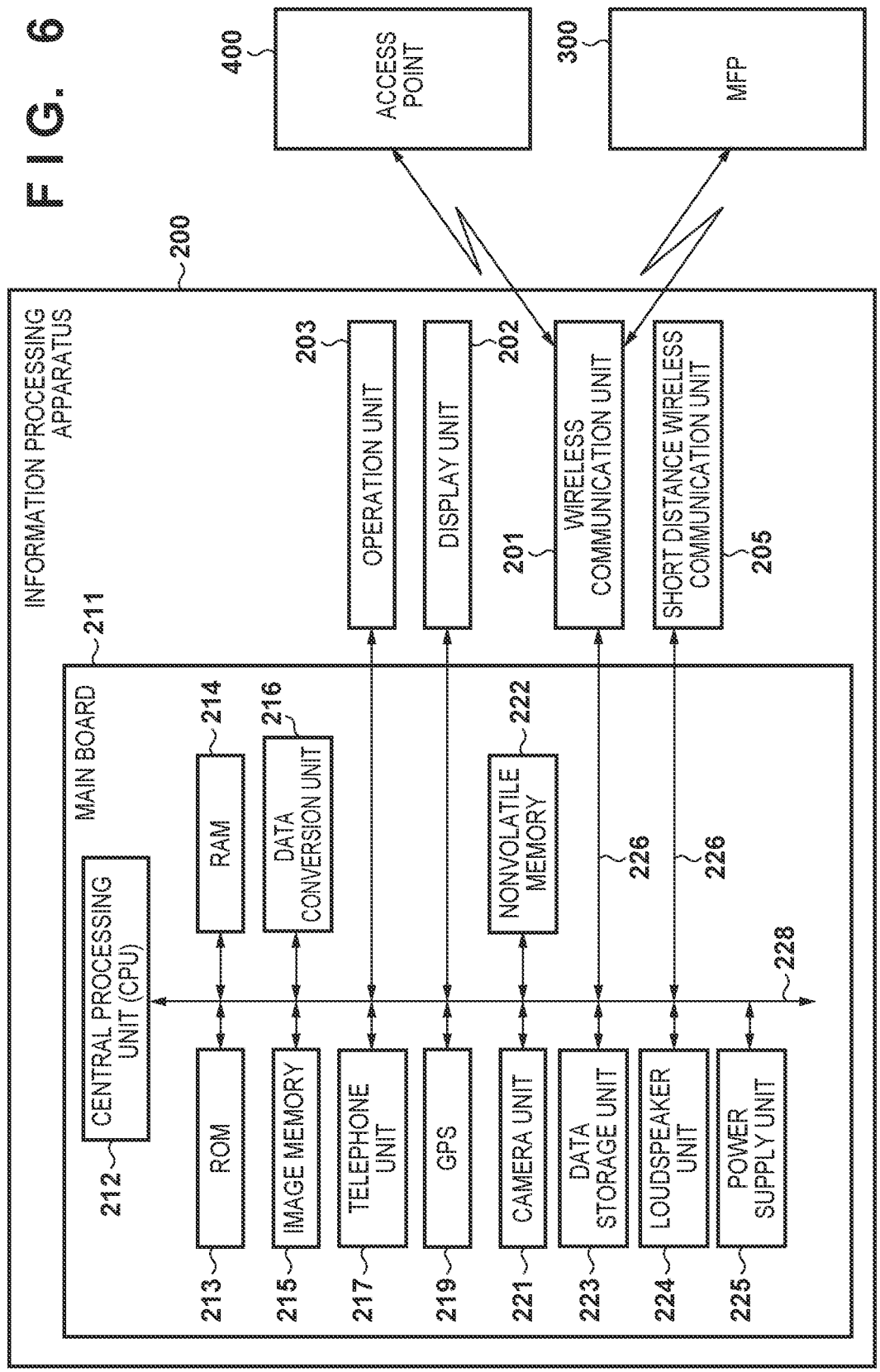
FIG. 6 is a block diagram showing the arrangement of the information processing apparatus.

The information processing apparatus 200 includes a wireless communication unit 201 that provides a WLAN communication function, as shown in FIG. 6. The wireless communication unit 201 is configured to execute data (packet) communication in a WLAN system complying with, for example, the IEEE802.11 standard series (IEEE802.11a/b/g/n/ac/ax and the like). However, the present invention is not limited to this, and the wireless communication unit 201 may be able to execute communication in a WLAN system complying with another standard. Note that in this embodiment, the wireless communication unit 201 can perform communication in both the 2.4- and 5-GHz frequency bands. The wireless communication unit 201 can execute communication in the WFD mode, communication in the software AP mode, communication in the wireless infrastructure mode, and the like. The operations in these modes will be described later.

FIG. 6 is a block diagram showing an example of the arrangement of the information processing apparatus 200. The information processing apparatus 200 includes a main board 211 that controls the overall apparatus, the wireless communication unit 201 that performs WLAN communication, the display unit 202, the operation unit 203, and a short distance wireless communication unit 205 that performs wireless communication different from that of the wireless communication unit 201. The main board 211 includes, for example, a CPU 212, a ROM 213, a RAM 214, an image memory 215, a data conversion unit 216, a telephone unit 217, a GPS 219, a camera unit 221, a nonvolatile memory 222, a data storage unit 223, a loudspeaker unit 224, and a power supply unit 225. Note that GPS is an abbreviation for Global Positioning System. These functional units in the main board 211 are connected to each other via a system bus 228. The main board 211 and the wireless communication unit 201, and the main board 211 and the short distance wireless communication unit 205 are connected via, for example, dedicated buses, respectively. The main board 211 and the display unit 202, and the main board 211 and the operation unit 203 are also connected via, for example, dedicated buses, respectively.

The CPU 212 serves as a system control unit, and controls the overall information processing apparatus 200. The operation of the information processing apparatus 200 described in this embodiment is implemented when, for example, the CPU 212 reads out programs stored in the ROM 213 and executes them. Note that dedicated hardware for each processing may be prepared. The ROM 213 stores control programs to be executed by the CPU 212, an embedded operating system (OS) program, and the like. The CPU 212 executes each control program stored in the ROM 213 under the management of the embedded OS stored in the ROM 213, thereby performing software control such as scheduling or task switching. The RAM 214 is implemented by an SRAM (Static RAM) or the like. The RAM 214 stores data such as program control variables, setting values registered by the user, and management data of the information processing apparatus 200. The RAM 214 can be used as various work buffers. The image memory 215 is implemented by a memory such as a DRAM (Dynamic RAM). The image memory 215 temporarily stores image data received via the wireless communication unit 201 and those read out from the data storage unit 223 so as to be processed by the CPU 212. The nonvolatile memory 222 is implemented by a memory such as a flash memory, and continuously stores data even after the information processing apparatus 200 is powered off. Note that the memory arrangement of the information processing apparatus 200 is not limited to the above-described one. For example, the image memory 215 and the RAM 214 may share a memory, or data may be backed up using the data storage unit 223. In this embodiment, an example of the image memory 215 is a DRAM. However, another storage medium such as a hard disk or a nonvolatile memory may be used.

The data conversion unit 216 can execute analysis of data of various formats, and data conversion such as color conversion and image conversion. The telephone unit 217 controls a telephone line, and implements telephone communication by processing audio data input/output via the loudspeaker unit 224 including a microphone and a loudspeaker. The GPS 219 acquires position information such as the current latitude and longitude of the information processing apparatus 200 by receiving a radio wave sent from a satellite. The camera unit 221 has a function of electronically recording and encoding an image input via a lens. Image data obtained by image capturing of the camera unit 221 is saved in the data storage unit 223. The loudspeaker unit 224 executes control to implement a function of inputting/outputting audio for a telephone function, an alarm notification function, and the like. The power supply unit 225 is, for example, a portable battery, and controls power supply to the apparatus. The power supply state of the information processing apparatus 200 includes, for example, a battery dead state in which there is no remaining battery amount, a power-off state in which the power key 204 is not pressed, an active state in which the apparatus is normally active, and a power saving state in which the apparatus is active but set in the power saving mode. The display unit 202 electronically controls the display contents to execute control for, for example, displaying various input contents and the operation state and status condition of the MFP 300. In response to acceptance of a user operation, the operation unit 203 executes control for, for example, generating an electrical signal corresponding to the operation and outputting it to the CPU 212.

The information processing apparatus 200 performs wireless communication using the wireless communication unit 201, and performs data communication with another communication apparatus such as the MFP 300. The wireless communication unit 201 converts data into packets, and transmits the packets to another communication apparatus. Furthermore, the wireless communication unit 201 reconstructs, to original data, packets from another external communication apparatus, and outputs the data to the CPU 212. The wireless communication unit 201 is a unit for implementing communication complying with a standard such as the WLAN standard. The short distance wireless communication unit 205 performs communication by a communication method different from that of the wireless communication unit 201, for example, Bluetooth®.

Figure 7:
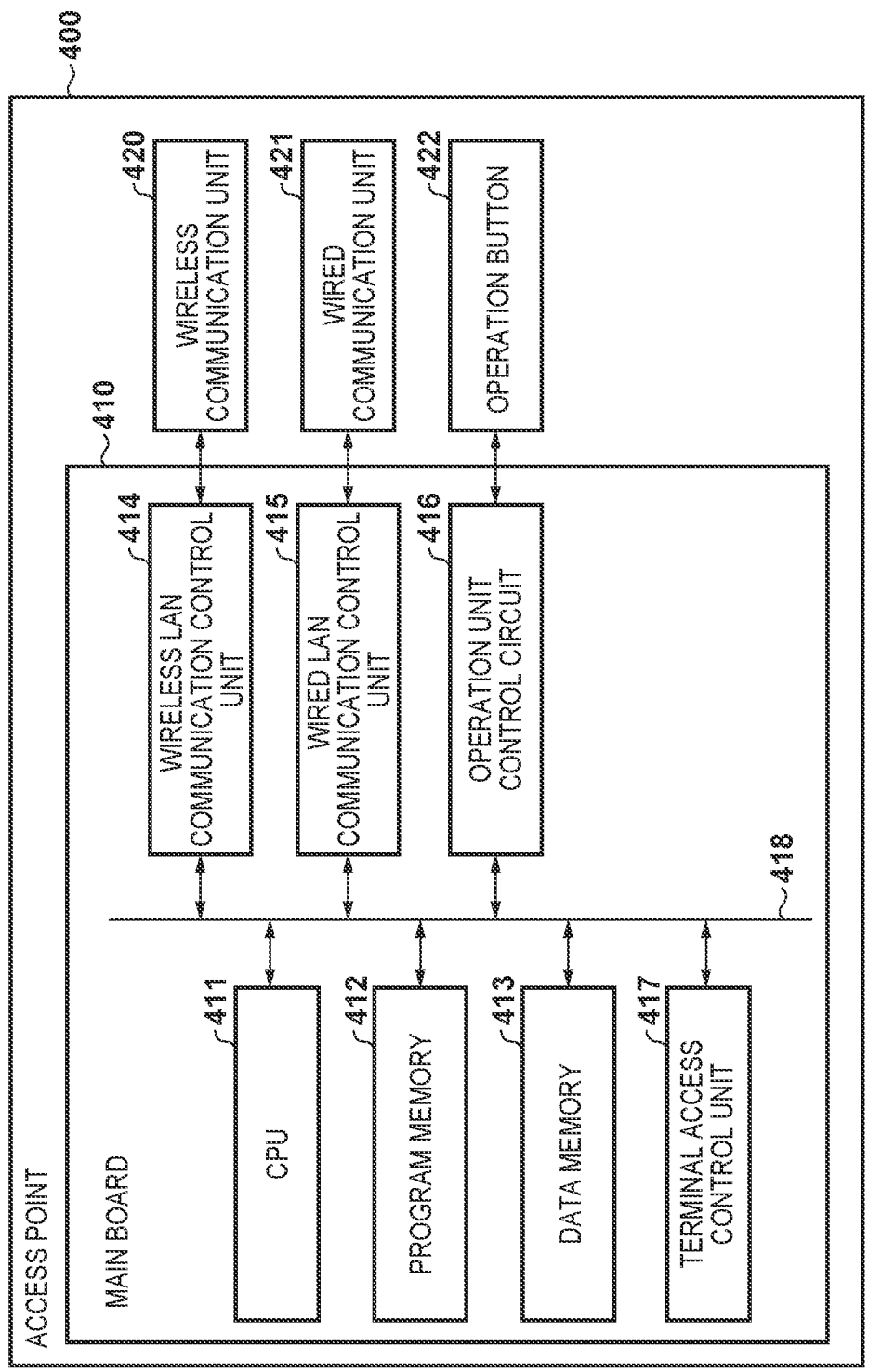
FIG. 7 is a block diagram showing the arrangement of an access point.

FIG. 7 is a block diagram showing an example of the arrangement of the access point 400 having a wireless LAN access point function. The access point 400 includes a main board 410 that controls the access point 400, a wireless communication unit 420, a wired communication unit 421, and an operation button 422.

In the main board 410, a CPU 411 in the form of a microprocessor is provided. The CPU 411 operates in accordance with control programs stored in a program memory 412 in the form of a ROM connected via an internal bus 418 and contents stored in a data memory 413 in the form of a RAM. The operation of the access point 400 according to this embodiment is implemented when, for example, the CPU 411 reads out the programs stored in the program memory 412 and executes them. The CPU 411 controls the wireless communication unit 420 via a wireless communication control unit 414 to perform wireless LAN communication with another communication apparatus. The CPU 411 controls the wired communication unit 421 via a wired communication control unit 415 to perform wired LAN communication with another communication apparatus. The CPU 411 accepts an operation from the user by the operation button 422 via an operation unit control circuit 416.

The access point 400 includes a terminal access control unit 417. The terminal access control unit 417 protects the network by authenticating a communication apparatus to be connected to the network. The terminal access control unit 417 authenticates a communication apparatus to be connected to the network by various methods. The various methods include, for example, the PSK method using a PSK (Pre Shared Key), the SAE method using an SAE (Simultaneous Authentication of Equals), and the EAP method using the authentication server 500 complying with IEEE802.1X/EAP.

Figure 8:
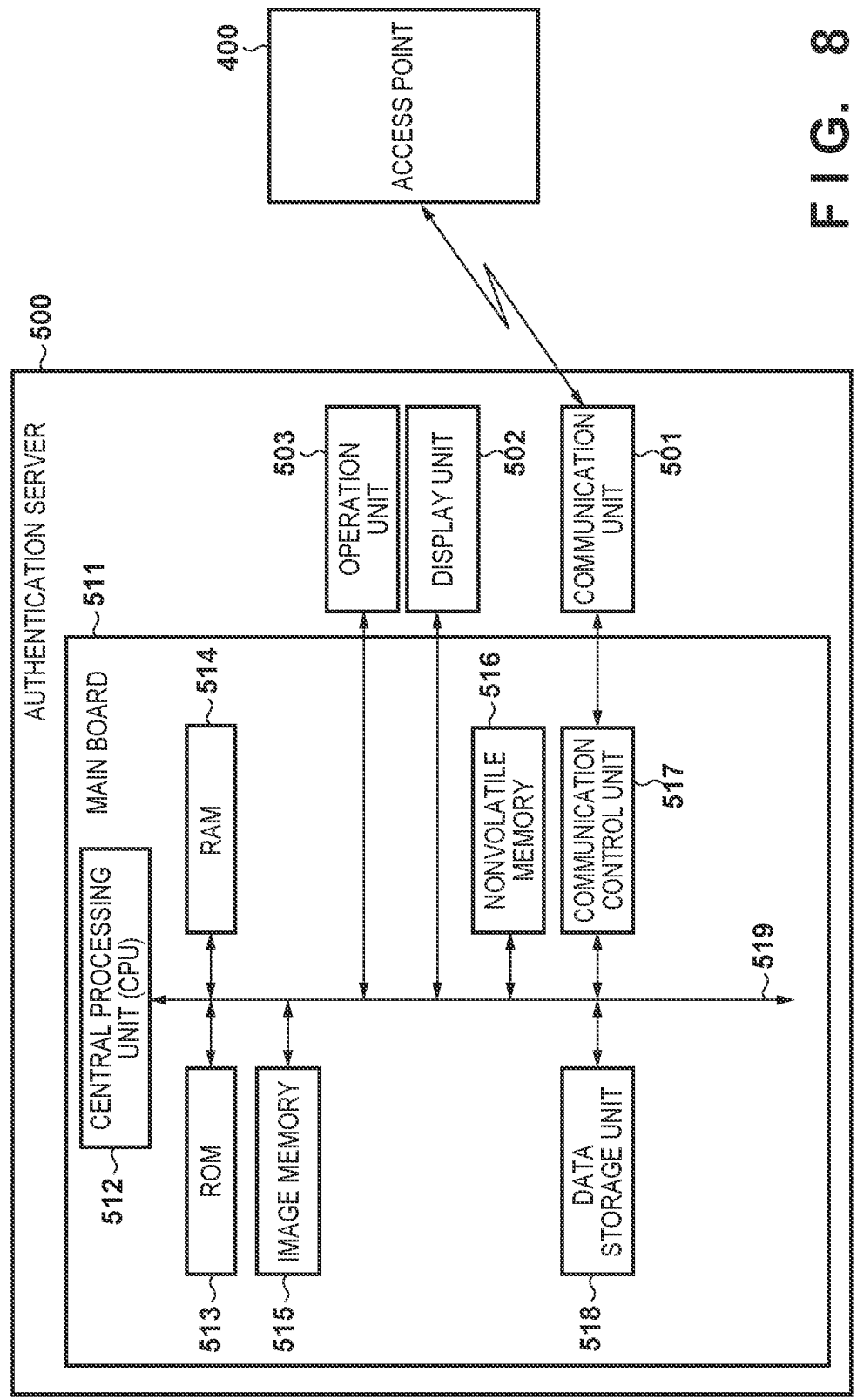
FIG. 8 is a block diagram showing the arrangement of an authentication server.

FIG. 8 is a block diagram showing an example of the arrangement of the authentication server 500. The authentication server 500 includes a main board 511 that controls the authentication server 500, a communication unit 501 that performs wired LAN communication and the like, a display unit 502, and an operation unit 503. The main board 511 includes a CPU 512, a ROM 513, a RAM 514, an image memory 515, a nonvolatile memory 516, a data storage unit 518, and a communication control unit 517. The functional units in the main board 511 are connected to each other via a system bus 519. The main board 511 and the communication unit 501, the main board 511 and the display unit 502, and the main board 511 and the operation unit 503 are connected via, for example, dedicated buses, respectively.

The CPU 512 serves as a system control unit, and controls the overall authentication server 500. The operation of the authentication server 500 according to this embodiment is implemented when, for example, the CPU 512 reads out programs stored in the ROM 513 and executes them. Note that dedicated hardware for each processing may be prepared. The ROM 513 stores control programs to be executed by the CPU 512, an embedded operating system (OS) program, and the like. The CPU 512 executes each control program stored in the ROM 513 under the management of the embedded OS stored in the ROM 513, thereby performing software control such as scheduling or task switching. The RAM 514 is implemented by an SRAM (Static RAM) or the like. The RAM 514 stores data such as program control variables, setting values registered by the user, and management data of the authentication server 500. The RAM 514 can be used as various work buffers. The image memory 515 is implemented by a memory such as a DRAM (Dynamic RAM). The image memory 515 temporarily stores image data received via the communication unit 501 and those read out from the data storage unit 518 so as to be processed by the CPU 512. The data storage unit 518 is implemented by a storage medium such as an SSD (Solid State Drive), and continuously stores data even after the authentication server 500 is powered off. In this embodiment, the SSD is exemplified as an example of the data storage unit 518. However, another storage medium such as a hard disk or nonvolatile memory may be used. The display unit 502 electronically controls the display contents to execute control for, for example, displaying various input contents and the status condition. In response to acceptance of a user operation, the operation unit 503 executes control for, for example, generating an electrical signal corresponding to the operation and outputting it to the CPU 512.

The CPU 512 controls the communication control unit 517 to perform communication using the communication unit 501, thereby performing data communication with another communication apparatus such as the access point 400. The communication unit 501 converts data into packets, and transmits the packets to another communication apparatus. Furthermore, the communication unit 501 reconstructs, to original data, packets from another external communication apparatus, and outputs the data to the CPU 512. The communication unit 501 can perform data (packet) communication in a wired LAN (Ethernet) system complying with, for example, the IEEE802.3 series.

The communication modes in which the communication apparatuses in the communication system 100 can operate will be described below.

[Wireless Direct Mode]

A communication method in the wireless direct mode in which apparatuses directly, wirelessly communicate with each other without intervention of an external access point in WLAN communication will be described. Communication in the wireless direct mode can be implemented using a plurality of methods. For example, a communication apparatus executes communication in the wireless direct mode by selectively using one of the above-described wireless direct modes. Note that communication in the wireless direct mode will sometimes be referred to as "wireless direct communication" or "P2P communication" hereinafter.

For example, a communication apparatus capable of executing wireless direct communication is configured to support at least one of the software AP mode and the Wi-Fi Direct (WFD) mode. On the other hand, a communication apparatus capable of executing wireless direct communication need not support all the modes, and may be configured to support some of the modes. In this embodiment, the communication apparatus can support the wireless infrastructure mode in addition to the wireless direct modes.

A communication apparatus (for example, the information processing apparatus 200) having the communication function in the WFD mode calls an application for implementing the communication function by accepting a user operation via an operation unit. Then, the communication apparatus executes communication in the WFD mode based on a user operation accepted via a user interface screen provided by the application. Note that the MFP 300 operating in the P2P mode operates as a master in connection/communication to/with another apparatus. Note that the WFD mode is not limited to this, and the MFP 300 may operate as a station by executing group owner negotiation.

[Wireless Infrastructure Mode]

In contrast to the wireless direct mode, in the wireless infrastructure mode, communication apparatuses which communicate with each other are connected to an external access point that controls a network and communication between the communication apparatuses is performed via the external access point. In this example, the communication apparatuses are, for example, the information processing apparatus 200 and the MFP 300. In other words, communication between the communication apparatuses is executed via the network created by the external access point. The MFP 300 operating in the wireless infrastructure mode operates as a station in connection/communication to/with the access point 400. In the wireless infrastructure mode, each communication apparatus searches for an external access point by transmitting an apparatus search request (Probe Request). If each communication apparatus receives an apparatus search response (Probe Response) from the external access point, it displays an SSID included in the Probe Response. For example, each of the information processing apparatus 200 and the MFP 300 finds the access point 400, transmits a connection request to the access point 400, and is connected to the access point 400, thereby enabling communication between these communication apparatuses in the wireless infrastructure mode via the access point 400. Note that a plurality of communication apparatuses may be connected to different access points. In this case, when data transfer is performed between the access points, communication between the communication apparatuses is possible. As commands and parameters transmitted/received via the access point at the time of communication between the communication apparatuses, commands and parameters defined by the Wi-Fi standard are used. In the above-described arrangement, the access point 400 decides the frequency band and the frequency channel. Therefore, the access point 400 selects one of the 5- and 2.4-GHz frequency bands to be used and selects the frequency channel to be used in the frequency band.

When the information processing apparatus 200 or the MFP 300 is connected to the wireless LAN formed by the access point 400, the access point 400 performs authentication. The information processing apparatus 200 or the MFP 300 is authenticated by the authentication method of the wireless LAN formed by the access point 400, and can thus be connected to the wireless LAN. Examples of the authentication method of the wireless LAN include the PSK method using a PSK, the SAE method using an SAE, and the EAP method using the authentication server complying with IEEE802.1X/EAP.

[Wired Communication Mode]

The wired communication mode is a communication mode in which communication apparatuses communicate with each other by a wired LAN or the like. When operating in the wired communication mode, the MFP 300 cannot operate in the wireless infrastructure mode. In the wired communication mode, for example, data (packet) communication in the wired LAN (Ethernet) complying with the IEEE802.3 series is performed. When operating in a state in which the IEEE802.1X/EAP setting is enabled, the MFP 300 executes IEEE802.1X authentication to be connected to the wired LAN formed by the access point 400.

[Simultaneous Wireless Operation]

If communication in each of the two modes is communication by the authentication method not using the authentication server 500, the MFP 300 can execute communications in the respective modes simultaneously (in parallel). That is, connections for executing communications in the respective modes are maintained simultaneously. More specifically, for example, communication in the wireless infrastructure mode and communication in the P2P mode can be executed simultaneously. Therefore, the MFP 300 maintains both connection for communication in the wireless infrastructure mode and connection for communication in the P2P mode simultaneously. This operation may be expressed as a "simultaneous wireless operation". In other words, the wireless simultaneous operation is, for example, an operation in which the MFP 300 simultaneously executes an operation as a station in Wi-Fi communication in the wireless infrastructure mode and an operation as a master in Wi-Fi communication in the P2P mode. On the other hand, if the MFP 300 performs communication by the authentication method using the authentication server 500, it does not maintain infrastructure connection and P2P connection simultaneously.

The power mode of the MFP 300 will be described next. The power mode of the MFP 300 includes, for example, a normal power mode and a power saving mode in which the power consumption is smaller than in the normal power mode. The MFP 300 is configured to operate in a plurality of modes including these modes.

In a state in which the MFP 300 operates in the normal power mode, for example, power is supplied to the CPU 311, the printing unit 316, the operation display unit 302, and the communication unit 322 in the MFP 300. Thus, in the state in which the MFP 300 operates in the normal power mode, the MFP 300 can execute, for example, print processing by the printing unit 316, display processing and operation acceptance processing by the operation display unit 302, and communication processing by the communication unit 322. Furthermore, in the state in which the MFP 300 operates in the normal power mode, the CPU 311 operates at a predetermined operating frequency (first operating frequency). If the communication unit 322 includes the CPU 323 dedicated for the communication unit, the CPU 323 operates at a predetermined operating frequency (second operating frequency). Note that the first operating frequency and the second operating frequency may be the same or different. This embodiment assumes that the first operating frequency is higher. Note that in order for each CPU to operate at a high operating frequency, each CPU needs to be supplied with a fast clock. To do this, in this embodiment, the CPU operating at a higher operating frequency is supplied with a faster clock.

In a state in which the MFP 300 operates in the power saving mode, for example, power is supplied to the CPU 311 and the communication unit 322 in the MFP 300. Note that in the state in which the MFP 300 operates in the power saving mode, no power is supplied to part of the printing unit 316 or part of the operation display unit 302, unlike the normal power mode. Thus, in the state in which the MFP 300 operates in the power saving mode, the MFP 300 cannot execute print processing by the printing unit 316 or display processing by the operation display unit 302 but can execute operation acceptance processing and communication processing by the communication unit 322. Furthermore, in the state in which the MFP 300 operates in the power saving mode, the CPU 311 operates at the third operating frequency lower than the first operating frequency. If the communication unit 322 includes the CPU 323 dedicated for the communication unit, the CPU 323 operates at the fourth operating frequency lower than the second operating frequency in the state in which the MFP 300 operates in the power saving mode. Note that the third operating frequency and the fourth operating frequency may be the same or different. This embodiment assumes that the third operating frequency is higher.

Note that the plurality of power modes may include a power mode other than the above-described power modes. For example, in this embodiment, a soft-off mode in which the power consumption is smaller than in the power saving mode. In a state in which the MFP 300 operates in the soft-off mode, power is supplied to the CPU 311 but no power is supplied to parts of the printing unit 316, the communication unit 322, and the operation display unit 302. Therefore, in the state in which the MFP 300 operates in the soft-off mode, the MFP 300 cannot execute, for example, print processing by the printing unit 316, display processing or operation acceptance processing by the operation display unit 302 other than the power button 301, or communication processing by the communication unit 322. Then, in the state in which the MFP 300 operates in the soft-off mode, if the power button 301 accepts an operation, the MFP 300 shifts to the normal power mode. In the state in which the MFP 300 operates in the normal power mode or the power saving mode, if the power button 301 accepts an operation, the MFP 300 shifts to the soft-off mode. In the state in which the MFP 300 operates in the soft-off mode, the CPU 311 operates at the fifth operating frequency lower than the third operating frequency. Note that if, for example, an automatic power-on function as a function of automatically shifting to the normal power mode when the information processing apparatus 200 transmits a command by communication by the communication unit 322 is enabled, the MFP 300 may be able to execute communication processing by the communication unit 322 by supplying power to the communication unit 322 even in the state in which the MFP 300 operates in the soft-off mode.

The plurality of power modes may include an intermediate mode in which the power consumption is larger than in the power saving mode and is smaller than in the normal power mode. In a state in which the MFP 300 operates in the intermediate mode, for example, power is supplied to the CPU 311 and the communication unit 322. Note that in the state in which the MFP 300 operates in the intermediate mode, no power is supplied to part of the printing unit 316 or part of the operation display unit 302 unlike the normal power mode. In the state in which the MFP 300 operates in the intermediate mode, the CPU 311 operates at the seventh operating frequency lower than the first operating frequency and higher than the third operating frequency. If the communication unit 322 includes the CPU 323 dedicated for the communication unit, the CPU 323 operates at the eighth operating frequency lower than the second operating frequency and higher than the fourth operating frequency in the state in which the MFP 300 operates in the intermediate mode. Note that the intermediate mode is, for example, a mode used to prepare for shifting to the power saving mode when shifting from the normal power mode to the power saving mode, and a condition for shifting to the intermediate mode is the same as that for shifting to the power saving mode. That is, after shifting from the normal power mode to the intermediate mode, the MFP 300 shifts from the intermediate mode to the power saving mode. In this way, in shifting from the normal power mode to the power saving mode, an operation in another mode may be performed.

Figure 14:
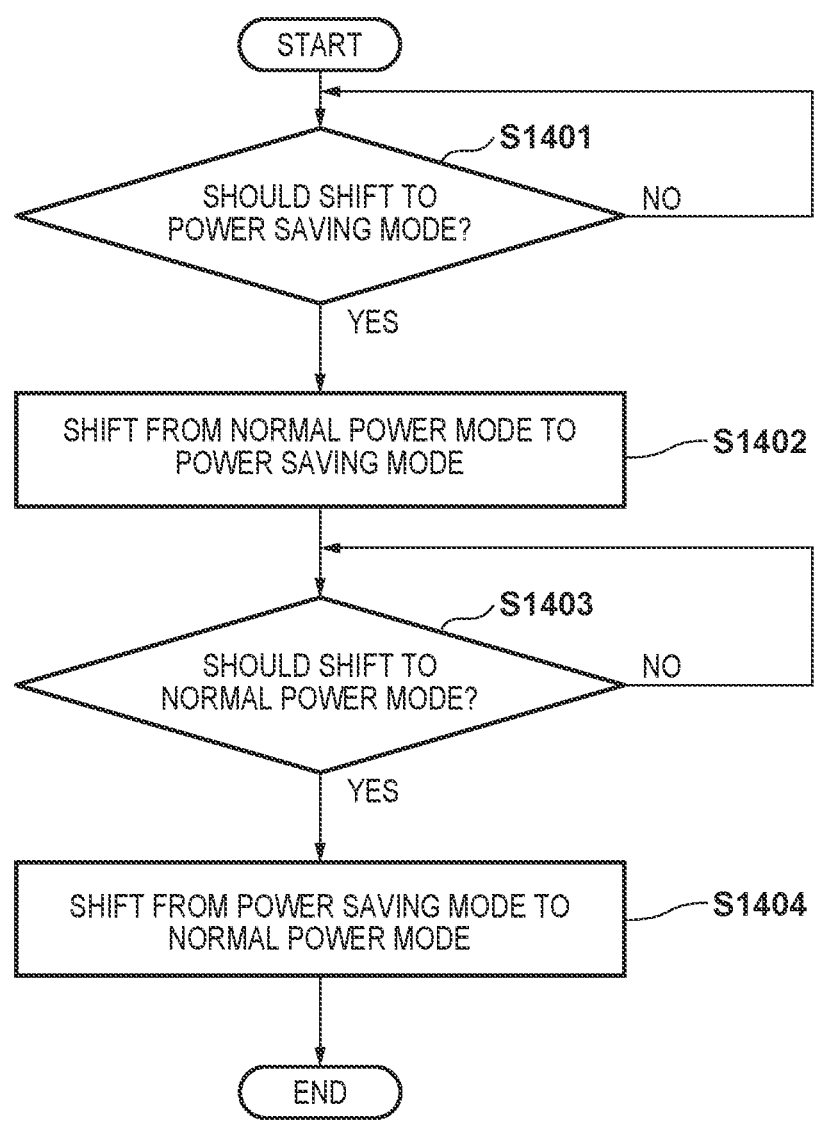
FIG. 14 is a flowchart illustrating processing of changing the power mode of the MFP.

Processing of changing the power mode of the MFP 300 according to this embodiment will be described with reference to FIG. 14. Note that if the power mode of the MFP 300 is the normal power mode, processing from step S1401 is executed. If the power mode of the MFP 300 is the power saving mode, processing from step S1403 is executed. The power mode control unit 325 shown in FIG. 3 can perform switching control of the power mode of the MFP 300, and switches the power mode if the condition for shifting the power mode is satisfied. Note that although not shown in FIG. 14, if the operation of the power button 301 is accepted during the processing shown in FIG. 14, the power mode shifts to the soft-off mode, as described above. That is, the condition for shifting to the soft-off mode is that the operation of the power button 301 is accepted.

In step S1401, the power mode control unit 325 determines whether the state of the MFP 300 satisfies the condition for shifting to the power saving mode. The processing in step S1401 is repeated until it is determined that the condition for shifting to the power saving mode is satisfied. The condition for shifting to the power saving mode is that, for example, a user operation via the operation display unit 302 other than the power button 301 has not been accepted for a predetermined time. Alternatively, for example, the condition is that a job has not been accepted by communication from the information processing apparatus 200 or the like via the USB communication unit 308, the wireless communication unit 307, the wired communication unit 321, or the like for a predetermined time. If it is determined that the condition for shifting to the power saving mode is satisfied, the power mode control unit 325 switches, in step S1402, the power mode from the normal power mode to the power saving mode. When switching to the power saving mode, the power mode control unit 325 reduces the operating frequency of the CPU 311 from the first operating frequency to the third operating frequency. If the communication unit 322 includes the CPU 323 dedicated for the communication unit, the power mode control unit 325 reduces the operating frequency of the CPU 323 from the second operating frequency to the fourth operating frequency.

In step S1403, the power mode control unit 325 determines whether the state of the MFP 300 satisfies the condition for shifting to the normal power mode. The processing in step S1403 is repeated until it is determined that the condition for shifting to the normal power mode is satisfied. The condition for shifting to the normal power mode is that, for example, a user operation via the operation display unit 302 other than the power button 301 is accepted. Alternatively, for example, the condition is that a job is accepted by communication from the information processing apparatus 200 or the like via the USB communication unit 308, the wireless communication unit 307, the wired communication unit 321, or the like. If the condition for shifting to the normal power mode is satisfied, a component corresponding to the satisfied shift condition among the operation control unit 319, the USB communication control unit 320, and the communication control unit 318 transmits, to the power mode control unit 325, a request to change the power mode to the normal power mode. Upon receiving the request, the power mode control unit 325 determines that the condition for shifting to the normal power mode is satisfied, and the process advances to step S1404.

In step S1404, the power mode control unit 325 switches the power mode from the power saving mode to the normal power mode. When switching to the normal power mode, the power mode control unit 325 switches the operating frequency of the CPU 311 from the third operating frequency to the first operating frequency. If the communication unit 322 includes the CPU 323 dedicated for the communication unit, the power mode control unit 325 switches the operating frequency of the CPU 323 from the fourth frequency to the second frequency.

As described above, in this embodiment, to switch the power mode of the MFP 300, the operating frequency of the CPU is controlled.

Next, user interface screens displayed on the operation display unit 302 of the MFP 300 and the display unit 202 of the information processing apparatus 200 to connect the MFP 300 to the network of the access point 400 of the authentication method using the authentication server 500 will be described.

Figure 11A:
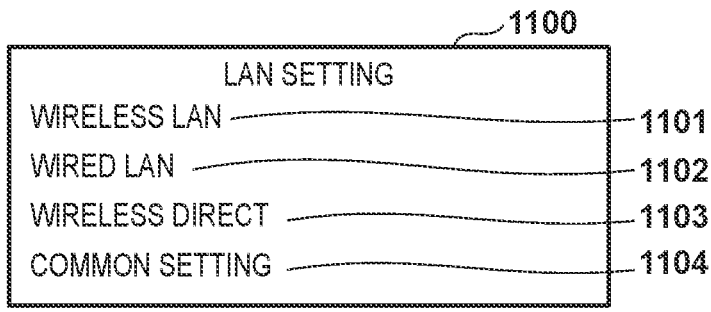
FIGS. 11A to 11J are views for explaining transition of a screen on the operation display unit of the MFP.
Figure 11B:
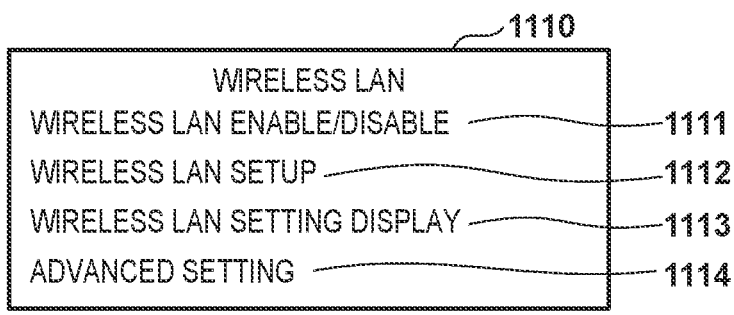

FIGS. 11A to 11J are views for explaining transition of a screen when a LAN setting 342 is selected from the setting menu of the screen 341 shown in FIG. 4B on the operation display unit 302 of the MFP 300. A screen 1100 shown in FIG. 11A is a screen which is displayed when the "LAN setting" 342 is selected in the screen 341 shown in FIG. 4B and in which the user can change the LAN setting. A screen 1110 shown in FIG. 11B is a screen which is displayed when "wireless LAN" 1101 is selected in the screen 1100 shown in FIG. 11A and in which the user can change the wireless LAN setting. In the screen 1110, "wireless LAN enable/disable" 1111, "wireless LAN setup" 1112, "wireless LAN setting display" 1113, and "advanced setting" 1114 are displayed. The "wireless LAN enable/disable" 1111 is a region for enabling or disabling a state in which the MFP 300 can perform communication using the wireless LAN. When a user operation is accepted in a display screen after the region is selected, the state in which the MFP 300 can perform communication using the wireless LAN is disabled or enabled. Note that in a state in which that state is disabled, the MFP 300 executes no communication or connection using the wireless LAN.

Figure 11C:
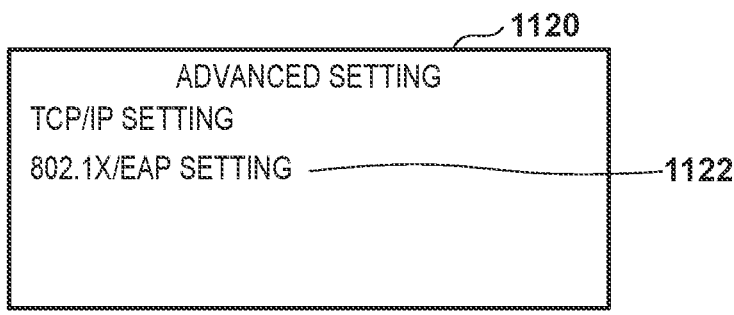
Figure 11D:
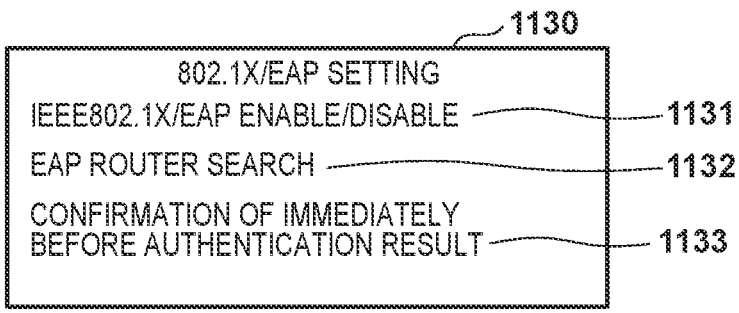

A screen 1120 shown in FIG. 11C is a screen which is displayed when the "advanced setting" 1114 is selected in the screen 1110 shown in FIG. 11B and in which the user can change the LAN advanced setting. A screen 1130 shown in FIG. 11D is a screen which is displayed when "802.1X/EAP setting" 1122 is selected in the screen 1120 shown in FIG. 11C and in which the user can change the IEEE802.1X/EAP setting.

Figure 11E:
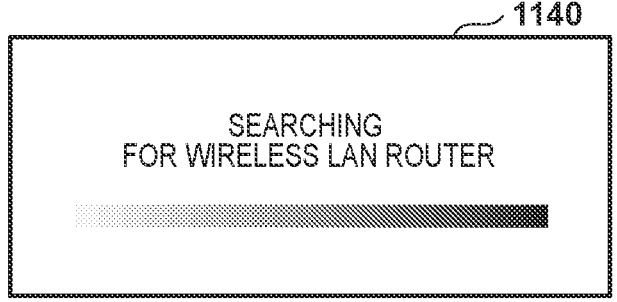

A screen 1140 shown in FIG. 11E is a screen which is displayed while "EAP router search" 1132 is selected in the screen 1130 in which the IEEE802.1X/EAP setting is enabled and a search for a wireless access point of the authentication method using the authentication server 500 is executed. The wireless access point search is processing of searching for access points existing around the MFP 300. The screen 1140 shown in FIG. 11E is also displayed while the "wireless LAN setup" 1112 is selected in the screen 1110 shown in FIG. 11B and a search for a wireless access point of the authentication method not using the authentication server 500 is executed.

Figure 11F:
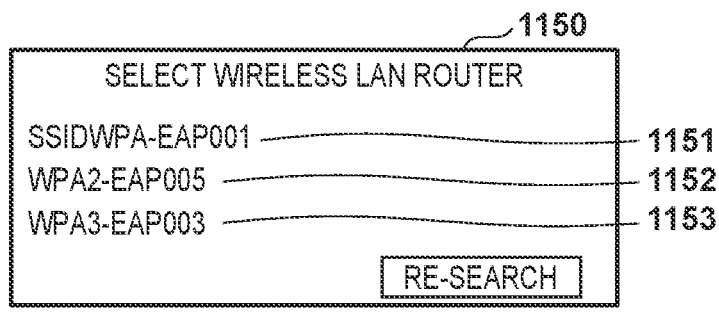

A screen 1150 shown in FIG. 11F is a screen for displaying a list of the identifiers (SSIDs: Service Set Identifiers) of wireless access points as a result of the wireless access point search. If the "EAP router search" 1132 is selected, an EAP router search is executed and only the SSIDs of wireless access points of the IEEE802.1X/EAP authentication method are displayed in the screen 1150 shown in FIG. 11F. Note that in this embodiment, the access point is, for example, a router, and thus a router search is a wireless access point search. If the "wireless LAN setup" 1112 is executed, only the SSIDs of wireless access points whose authentication method is not the IEEE802.1X/EAP authentication method are displayed.

Figure 11G:
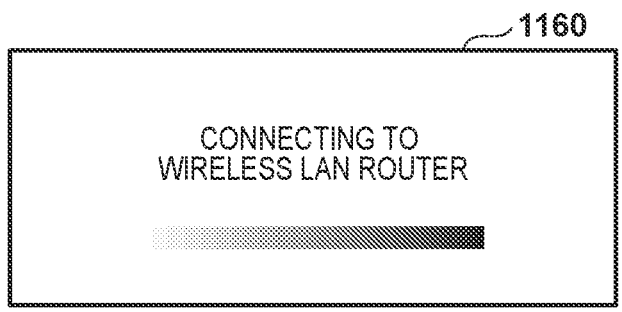
Figure 11H:
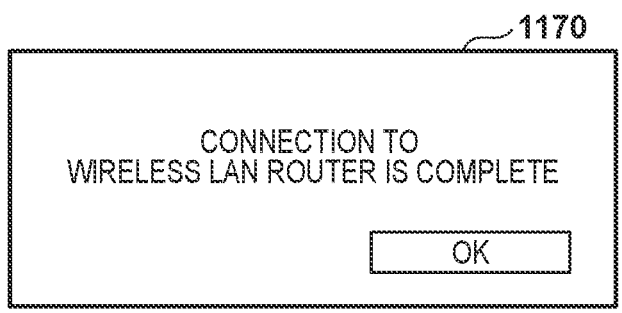

A screen 1160 shown in FIG. 11G is a screen which is displayed while one of SSIDs 1151, 1152, and 1153 of the wireless access points is selected in the screen 1150 shown in FIG. 11F and processing for connecting to the wireless access point is executed. A screen 1170 shown in FIG. 11H is a screen which is displayed when, after the screen 1160 shown in FIG. 11G is displayed, the attempt to execute connection to the access point is complete, and the connection succeeds or the connection proceeds to a predetermined stage.

Figure 11I:
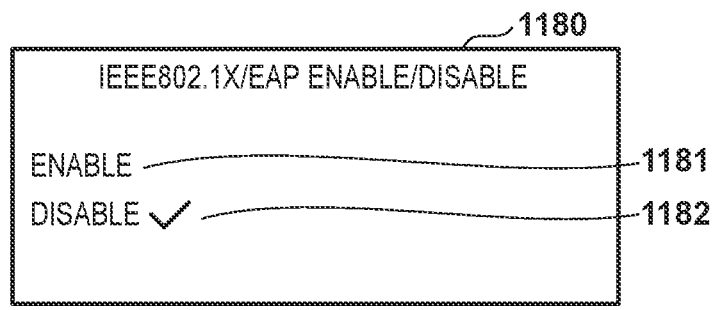
Figure 11J:
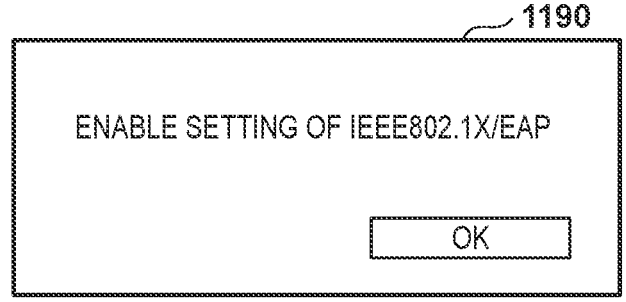

A screen 1180 shown in FIG. 11I is a screen which is displayed when "IEEE802.1X/EAP enable/disable" 1131 is selected in the screen 1130 shown in FIG. 11D and in which the user can change enable/disable of the IEEE802.1X/EAP setting. In the screen 1180, "enable" 1181 and "disable" 1182 are displayed. In a state in which the IEEE802.1X/EAP setting is disabled, the MFP 300 executes no connection to the access point by IEEE802.1 X/EAP. A screen 1190 shown in FIG. 11J is a screen which is displayed when the "EAP router search" 1132 is selected in the screen 1130 shown in FIG. 11D while the IEEE802.1X/EAP setting is disabled. That is, in this embodiment, if the IEEE802.1X/EAP setting is disabled, even if the "EAP router search" 1132 is selected, no router search is executed. Note that control not to execute connection to the access point by the IEEE802.1X/EAP authentication, which is executed when the IEEE802.1X/EAP setting is disabled, is not limited to the above-described control. For example, the MFP 300 may execute a router search but need not display, in a list of access points found by the router search, an access point in which IEEE802.1X/EAP authentication is enabled. Alternatively, an access point in which IEEE802.1X/EAP authentication is enabled may also be displayed in the list but even if the user selects the access point, the MFP 300 need not execute processing for connecting to the access point in which IEEE802.1X/EAP authentication is enabled.

Figure 9:
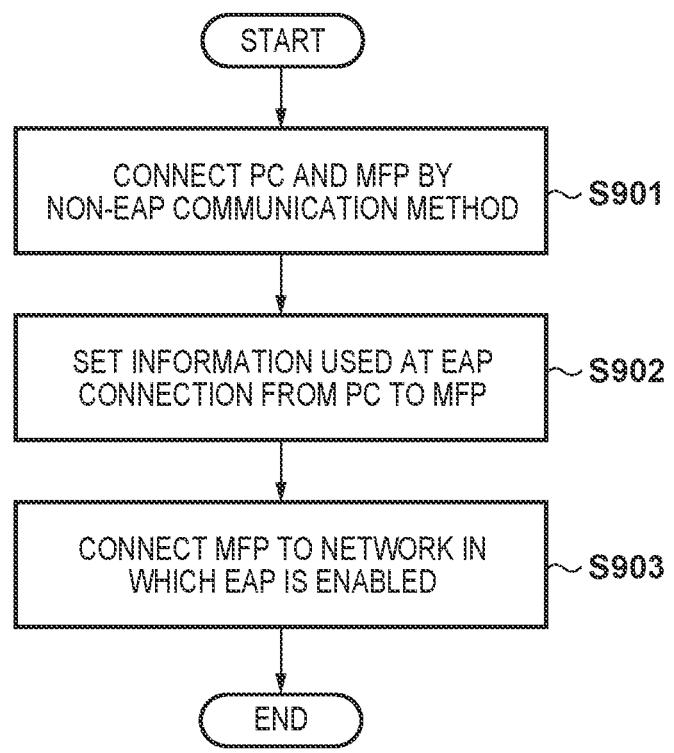
FIG. 9 is a flowchart illustrating an overview of processing of connecting the MFP to a network formed by the access point.

If the MFP 300 is connected to the network in which IEEE802.1X/EAP authentication is enabled, authentication needs to be performed after setting, in the MFP 300, information necessary for authentication. According to this embodiment, an overview of processing of connecting the MFP 300 to the network, formed by the access point 400, in which IEEE802.1X/EAP authentication is enabled will be described with reference to FIG. 9.

In step S901, the information processing apparatus 200 and the MFP 300 are connected to each other by a connection method in which IEEE802.1X/EAP authentication is disabled. In step S901, the information processing apparatus 200 and the MFP 300 are connected to the network, formed by the access point 400, in which IEEE802.1X/EAP authentication is disabled, as shown in FIG. 10B, and can communicate with each other via the access point 400. The network in which IEEE802.1X/EAP authentication is disabled is, for example, a network of the authentication method not using the authentication server 500. Connection between the information processing apparatus 200 and the MFP 300 may be implemented by connecting the information processing apparatus 200 to a network formed by the MFP 300 operating as a master in the wireless direct mode, as shown in FIG. 10C. That is, more specifically, for example, in step S901, the MFP 300 accepts a connection request from the information processing apparatus 200 and establishes connection between the information processing apparatus 200 and the MFP 300 operating in the P2P mode.

In step S902, the information processing apparatus 200 transmits IEEE802.1X/EAP authentication information to the MFP 300, as will be described with reference to FIGS. 12A to 12G. Then, the MFP 300 executes setting concerning IEEE802.1X/EAP authentication using the information. In step S903, the MFP 300 is connected to the network, formed by the access point 400, in which IEEE802.1X/EAP authentication is enabled, as will be described with reference to FIGS. 13A and 13B. In other words, the MFP 300 establishes connection to the access point in which IEEE802.1X/EAP authentication is enabled. In step S903, the apparatuses are connected to the network (the network using the authentication server 500), formed by the access point 400, in which IEEE802.1X/EAP authentication is enabled, as shown in FIG. 10A, and can communicate with each other via the access point 400.

Figure 12A:
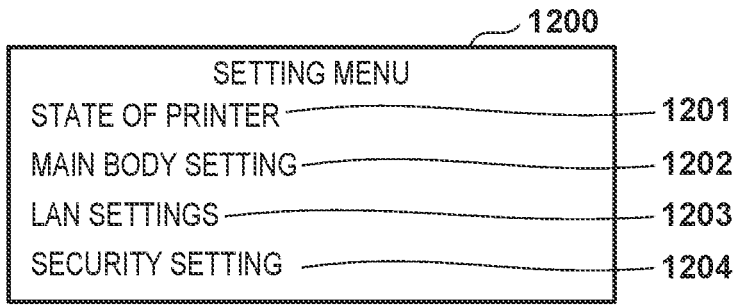
FIGS. 12A to 12G are views for explaining transition of a screen in the information processing apparatus.

FIGS. 12A to 12G are views for explaining transitions of a screen in the information processing apparatus 200. FIG. 12A shows an example of the setting screen of the MFP 300 displayed on the information processing apparatus 200. A screen 1200 shown in FIG. 12A is displayed when a Web browser or application operating on the information processing apparatus 200 communicates with an HTTP server operating on the MFP 300. Note that the screen 1200 shown in FIG. 12A may be displayed by performing standby response of an HTTP request in USB communication by the USB communication control unit 320 of the MFP 300.

Figure 12B:
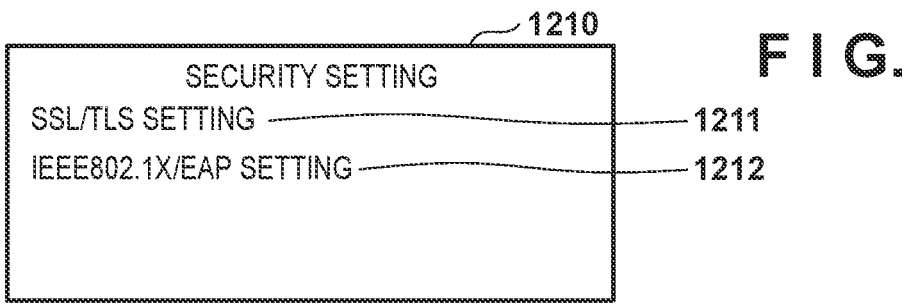

If "security setting" 1204 is selected in the screen 1200 shown in FIG. 12A, a screen 1210 shown in FIG. 12B is displayed. If "IEEE802.1X/EAP setting" 1212 is selected in the screen 1210 shown in FIG. 12B, a screen 1220 shown in FIG. 12C is displayed.

Figure 12C:
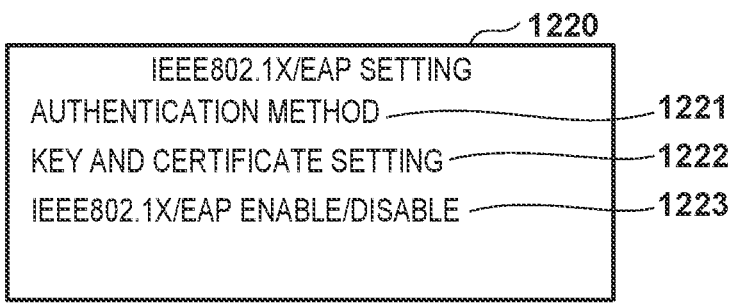
Figure 12D:
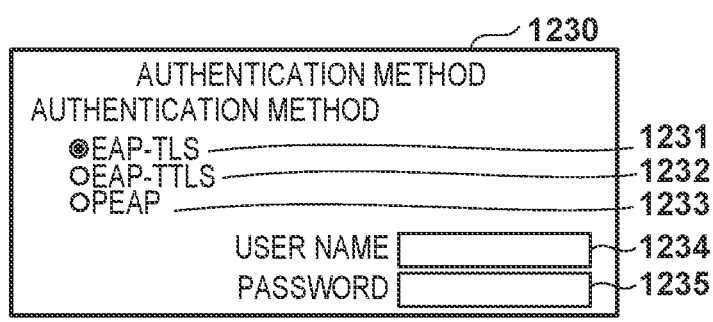

If "authentication method" 1221 is selected in the screen 1220 shown in FIG. 12C, a screen 1230 shown in FIG. 12D is displayed. When one of "EAP-TLS" 1231, "EAP-TTLS" 1232, and "PEAP" 1233 is selected in the screen 1230 shown in FIG. 12D, the authentication method to be used at the time of IEEE802.1X/EAP authentication is set in the MFP 300. If a user name is input to "user name" 1234 and a password is input to "password" 1235 in the screen 1230 shown in FIG. 12D, the user name and the password to be used at the time of IEEE802.1X/EAP authentication are set in the MFP 300.

Figure 12E:
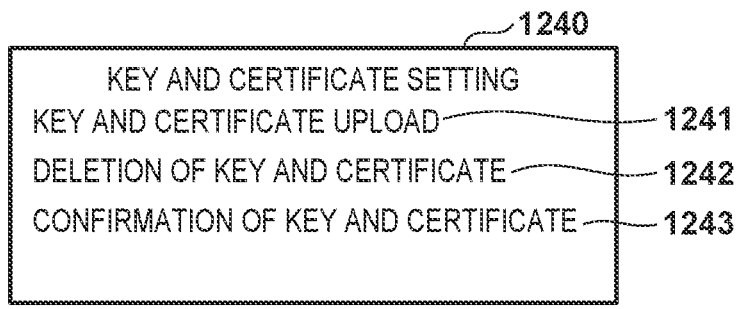
Figure 12F:
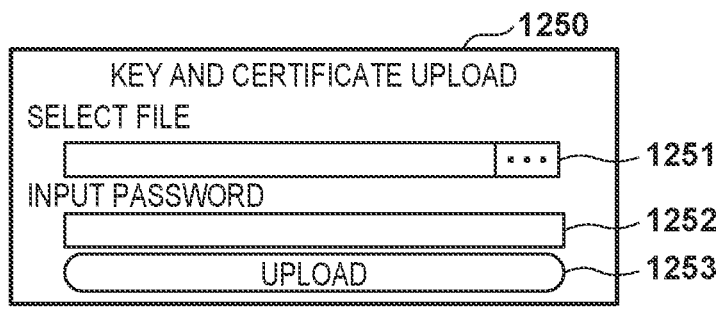

If the user selects "key and certificate setting" 1222 in the screen 1220 shown in FIG. 12C and selects "key and certificate upload" 1241 in a screen 1240 shown in FIG. 12E, a screen 1250 shown in FIG. 12F is displayed. In the screen 1250, the user can register, in the MFP 300, a certificate to be used at the time of IEEE802.1X/EAP authentication. If the user selects a file in "file selection" 1251 in the screen 1250 shown in FIG. 12F, a certificate to be used at the time of IEEE802.1X/EAP authentication is selected. Then, if the user inputs a password to "password" 1252 and selects "upload" 1253 in the screen 1250, the certificate and password to be used at the time of IEEE802.1X/EAP authentication are set in the MFP 300.

If the user selects "deletion of key and certificate" 1242 in the screen 1240 shown in FIG. 12E, it is possible to delete a certificate saved in the MFP 300. Alternatively, if the user selects "confirmation of key and certificate" 1243 in the screen 1240 shown in FIG. 12E, it is possible to display a list of certificates saved in the MFP 300.

Figure 12G:
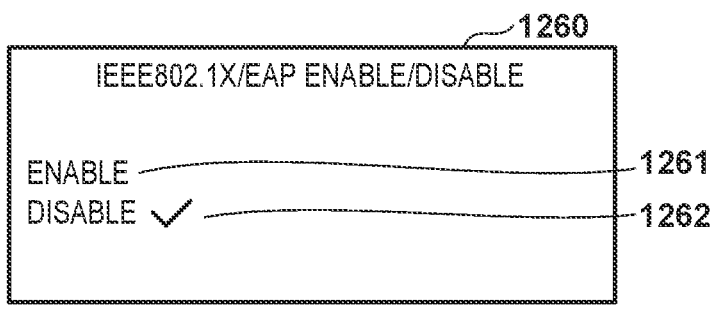

If the user selects "IEEE802.1X/EAP enable/disable" 1223 in the screen 1220 shown in FIG. 12C, a screen 1260 shown in FIG. 12G is displayed. In the screen 1260 shown in FIG. 12G, the user can enable or disable the IEEE802.1X/EAP setting of the MFP 300.

With the above user operation, the user can set, in the MFP 300, the authentication information to be used in IEEE802.1X/EAP authentication. When the authentication server 500 authenticates the MFP 300 using the set authentication information, the MFP 300 can be connected to the network that is formed by the access point 400 and uses the authentication server 500.

In this example, if the MFP 300 can enable a plurality of communication modes simultaneously (in parallel), more specifically, if the MFP 300 maintain connection in the wireless infrastructure mode and connection in the P2P mode simultaneously, the MFP 300 can connect the apparatus on the P2P connection side even while the MFP 300 is connected to the network using the authentication server 500 on the infrastructure connection side. In this case, an apparatus which is not authenticated by the authentication server 500 can change the settings of the MFP 300 and issue a print request. If the MFP 300 is connected to the network using the authentication server 500 on the infrastructure connection side, the change of the settings of the MFP 300 and execution of printing by an apparatus which is not authenticated by the authentication server 500 are preferably prevented regardless of the switching order of the communication mode.

Processing of dynamically switching the communication mode in accordance with the IEEE802.1X/EAP setting of the MFP 300 and the authentication method in the wireless infrastructure mode will be described below. This processing can improve convenience for setting the communication mode.

Figure 13A:
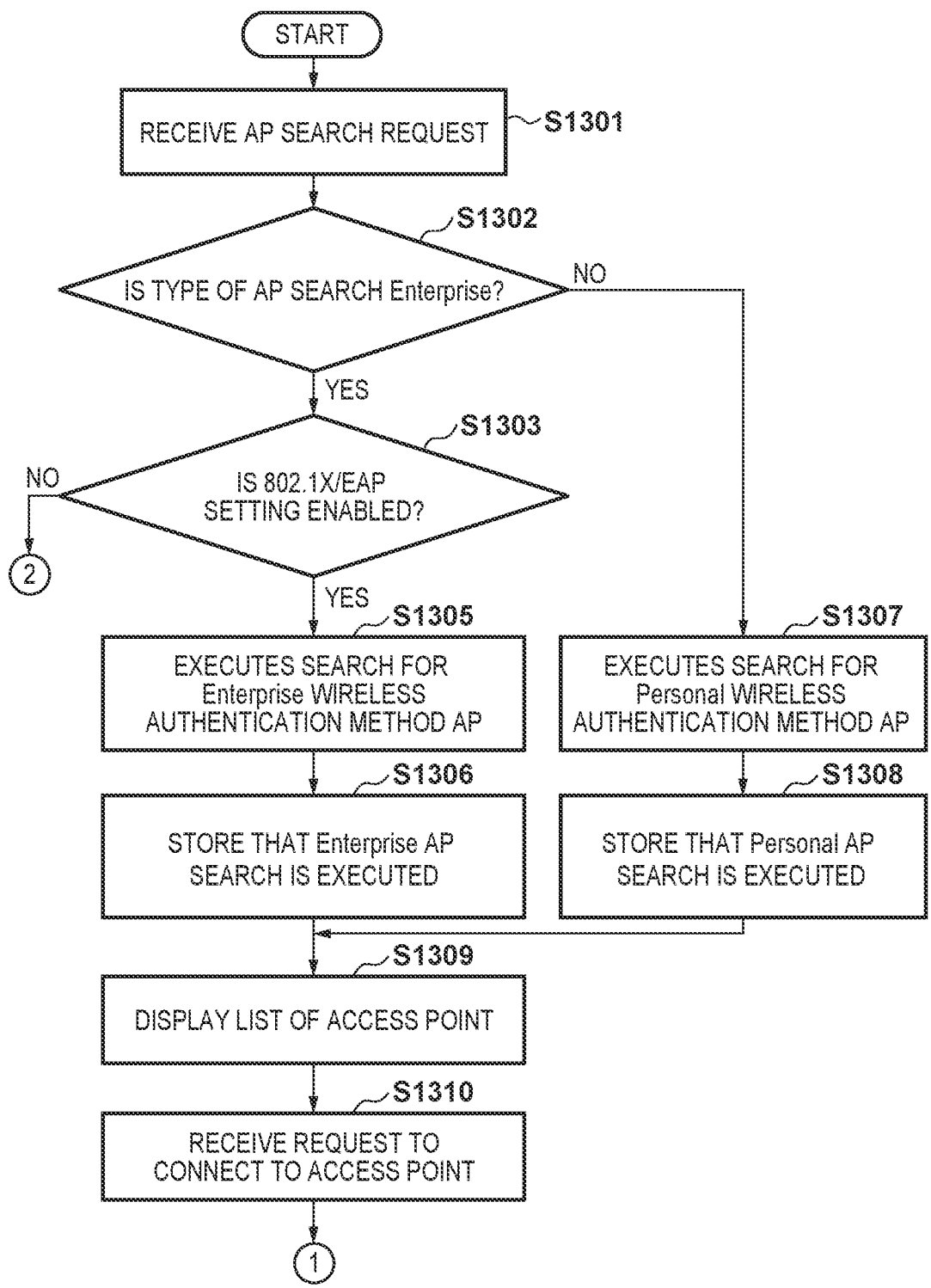

FIGS. 13A and 13B are flowcharts illustrating setup processing of connecting the MFP 300 to the network that is formed by the access point 400 and uses the authentication server 500. Note that before execution of the setup processing shown in FIGS. 13A and 13B, authentication information to be used for IEEE802.1X/EAP authentication needs to be set in the MFP 300 in step S902 of FIG. 9. If no authentication information is set in the MFP 300, EAP authentication fails. The processing shown in FIGS. 13A and 13B is implemented when, for example, the CPU 311 reads out programs stored in the program memory 313 and executes them.

In step S1301, the CPU 311 of the MFP 300 receives an access point search request. For example, when the user selects the "EAP router search" 1132 in the screen 1130 shown in FIG. 11D, the CPU 311 receives an access point search request.

In step S1302, the CPU 311 determines whether the access point search request is an Enterprise access point search request. In other words, in step S1302, it is determined whether the request is a request to search for an access point of the authentication method using the authentication server 500. An access point of the authentication method using the authentication server 500 will also be referred to as an Enterprise access point hereinafter. On the other hand, an access point of the authentication method not using the authentication server 500, for example, an authentication method using a common key will also be referred to as a Personal access point hereinafter. If the user selects the "EAP router search" 1132 in the screen 1130 shown in FIG. 11D, the CPU 311 determines that the search is an Enterprise access point search. On the other hand, if the user selects the "wireless LAN setup" 1112 in the screen 1110 shown in FIG. 11B, the CPU 311 determines that the search is not an Enterprise access point search. The determination processing in step S1302 may be performed based on whether the search request received by the MFP 300 via the communication path includes an instruction to search for an Enterprise access point. If it is determined in step S1302 that the access point search request is an Enterprise access point search request, the process advances to step S1303; otherwise, the process advances to step S1307.

In step S1303, the CPU 311 determines whether the IEEE802.1X/EAP setting is enabled. The determination processing in step S1303 is performed based on, for example, setting contents of the "IEEE802.1X/EAP enable/disable" 1131 in the screen 1130 shown in FIG. 11D. If it is determined in step S1303 that the IEEE802.1X/EAP setting is enabled, the process advances to step S1305; otherwise, the process advances to step S1304. In step S1304, the CPU 311 returns a response that an Enterprise access point search cannot be executed, and then ends the processing shown in FIGS. 13A and 13B. For example, if the "EAP router search" 1132 is selected in the screen 1130 shown in FIG. 11D while the IEEE802.1X/EAP setting is disabled, a screen like the screen 1190 shown in FIG. 11J is displayed in step S1304. The CPU 311 searches, in step S1305, for an access point of the authentication method using the authentication server 500, and stores, in step S1306, information indicating that the search for the access point of the authentication method using the authentication server 500 has been executed.

If it is determined in step S1302 that the access point search request is not an Enterprise access point search request, the CPU 311 executes, in step S1307, a Personal access point search. In step S1308, the CPU 311 stores information indicating that the Personal access point search has been executed. After steps S1306 and S1308, the process advances to step S1309.

In step S1309, the CPU 311 displays, as a result of the access point search, a list of the SSIDs of the wireless access points, as shown in the screen 1150 of FIG. 11F. In step S1310, the CPU 311 accepts a user selection of the SSID of the access point to be connected.

In step S1311, the CPU 311 determines whether the wireless direct mode is enabled. In this embodiment, since the enabled state (ON state)/disabled state (OFF state) of each communication mode is stored as setting information in the MFP 300, the determination processing in step S1311 is performed based on, for example, the stored information of each communication mode. If it is determined that the wireless direct mode is enabled, the process advances to step S1312; otherwise, the process advances to step S1316.

In step S1312, the CPU 311 determines whether the IEEE802.1X/EAP setting is enabled. The determination processing in step S1312 is performed based on, for example, setting contents of the "IEEE802.1X/EAP enable/disable" 1131 in the screen 1130 shown in FIG. 11D. If it is determined that the IEEE802.1X/EAP setting is enabled, the process advances to step S1313; otherwise, the process advances to step S1316.

In step S1313, the CPU 311 determines whether the access point to be connected is the access point of the authentication method using the authentication server 500. If it is determined that the access point to be connected is the access point of the authentication method using the authentication server 500, the process advances to step S1314; otherwise, the process advances to step S1316. The determination processing in step S1313 is performed based on, for example, contents stored in step S1306 or S1308.

In step S1314, the CPU 311 disables the wireless direct mode. Then, in step S1315, the CPU 311 enables the wireless infrastructure mode to execute, using the authentication information set in step S902, connection to the network, formed by the access point 400, of the authentication method using the authentication server 500. Note that, more specifically, disabling of the wireless direct mode is to set, for example, a state in which the MFP 300 establishes no Wi-Fi direct connection to another apparatus by stopping an operation as an access point or stopping an operation as a Wi-Fi Direct group owner.

In step S1311 and the subsequent steps, if the wireless direct mode is enabled, the IEEE802.1X/EAP setting is enabled, and the authentication method of the access point to be connected is the authentication method using the authentication server 500, the wireless direct mode is disabled and the wireless infrastructure mode is enabled. If the wireless infrastructure mode is enabled, the MFP 300 is connected to the access point 400 using the authentication information set from the information processing apparatus 200. Note that enabling of the wireless infrastructure mode is to start the operation in the wireless infrastructure mode.

If it is determined that any one of the conditions in steps S1311, S1312, and S1313 is not satisfied, the CPU 311 enables, in step S1316, the wireless infrastructure mode to connect the MFP 300 to the access point 400. In this case, connection in the wireless infrastructure mode is communication connection not using the IEEE802.1X/EAP authentication method. If it is determined in step S1312 that the condition is not satisfied or it is determined in step S1313 that the condition is not satisfied, both the wireless direct mode and the wireless infrastructure mode in which the IEEE802.1X/EAP authentication method is not used are enabled. Note that if the process advances to step S1315 after the SSID of the access point is selected in step S1310, the screen 1160 shown in FIG. 1 1G is displayed until an attempt to execute connection to the access point in step S1315 is started. If the process advances to step S1316, the screen 1160 shown in FIG. 11G is displayed until the success or failure of connection to the access point is confirmed in step S1316.

As described above, it is possible to connect the MFP 300 to the network, formed by the access point 400, of the authentication method using the authentication server 500.

Next, processing of appropriately switching the power mode of the MFP 300 when executing connection to the wireless network of the authentication method using the authentication server 500 will be described.

Figure 15:
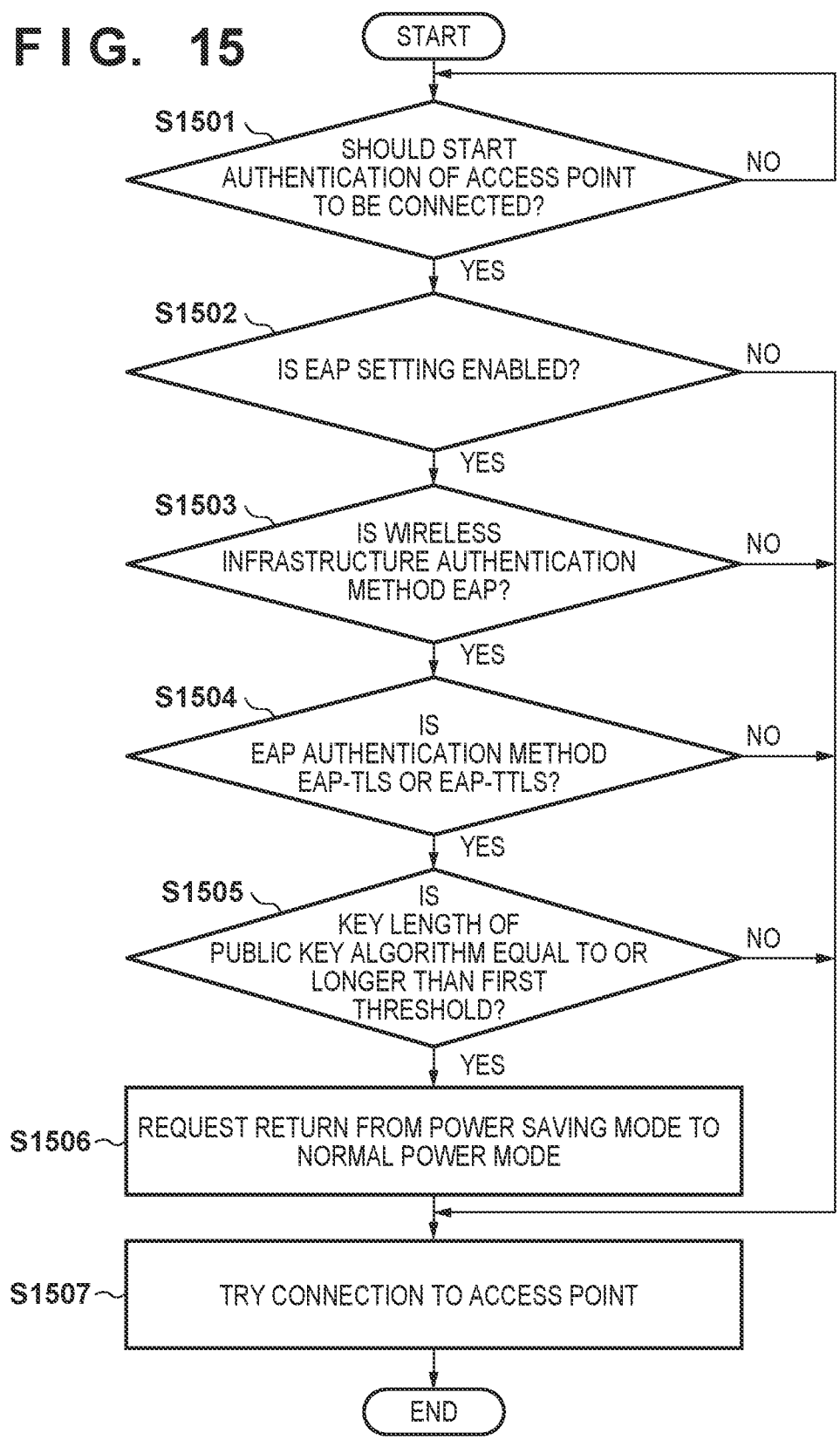
FIG. 15 is a flowchart illustrating processing of changing the operating frequency of the MFP.

FIG. 15 is a flowchart illustrating processing of changing the operating frequency of the MFP 300 when the MFP 300 attempts to execute connection to the access point 400. The processing shown in FIG. 15 is implemented when, for example, the CPU 311 reads out programs stored in the program memory 313 and executes them. The processing shown in FIG. 15 is executed when the communication mode of the MFP 300 is the wireless infrastructure mode and the MFP 300 is connected to the access point 400. A case in which the MFP 300 is connected to the access point 400 includes a case in which the MFP 300 is reconnected after disconnection of communication with the access point 400. For example, the processing shown in FIG. 15 is started in a state in which the MFP 300 operates in the power saving mode and in a state (to be referred to as a specific state hereinafter) in which a connection target access point is specified but the MFP 300 is not connected to the access point and currently executes a wireless access point search for searching for the connection target access point.

An effect obtained by executing the processing shown in FIG. 15 will be described. For example, after an instruction to execute connection to the access point 400 is received in step S1310, the MFP 300 executes a wireless access point search to find the access point 400 as the connection target access point in order to execute connection to the access point 400. However, if the MFP 300 executes a wireless access point search in a state in which the power of the access point 400 is OFF, the MFP 300 cannot find the access point 400. That is, a predetermined time elapses while the MFP 300 cannot be connected to the access point 400, and the MFP 300 shifts to the power saving mode. Note that in this embodiment, this state corresponds to the specific state. After that, if the power of the access point 400 is turned on, the access point 400 is found by the wireless access point search but the MFP 300 operates in the power saving mode at this time. That is, in this case, the MFP 300 attempts to execute connection to the access point 400 while operating in the power saving mode.

Alternatively, although the MFP 300 is connected to the access point 400 while operating in the normal power mode, the MFP 300 may shift to the power saving mode thereafter, and the connection between the MFP 300 and the access point 400 may be disconnected in this state. In this case, to execute reconnection to the access point 400 as the connection target access point, the MFP 300 executes a wireless access point search to find the access point 400. Note that in this embodiment, this state also corresponds to the specific state. If the access point 400 is found by the search, the MFP 300 attempts to execute connection to the access point 400 in the power saving mode. When the MFP 30) attempts to execute connection to the access point 400, authentication by the access point 400 may be required. However, if the length of the encryption key of the public key algorithm used in EAP authentication using the authentication server 500 is long in the state in which the operating frequency of the MFP 300 is reduced in the power saving mode, it takes time to perform authentication by the access point 400, and a time-out of the authentication may occur. That is, if the MFP 300 attempts to execute connection to the access point 400 in the power saving mode, connection to the access point 400 may fail.

To cope with this, in this embodiment, in the specific state, the power mode of the MFP 300 is changed in accordance with the communication mode of the MFP 300 and the authentication method used for connection to the access point, thereby dynamically changing the operating frequency. With this arrangement, the time taken to perform authentication can be shortened, thereby preventing a time-out of the authentication. In the case of an MFP including an embedded processor with the limited processing performance or an MFP in which the operating frequency of the processor can be changed not continuously but selectively from operating frequencies in several stages, it is assumed that the possibility of the time-out is high, and thus the effect of this embodiment is more conspicuous.

In step S1501, the CPU 311 determines whether it is possible to perform authentication processing with the access point 400 by fining the connection target access point 400 by the wireless access point search. If it is determined that it is possible to perform authentication processing with the access point 400, the process advances to step S1502; otherwise, the wireless access point search is continued until it becomes possible to perform authentication processing with the access point 400, thereby repeating the determination processing.

In step S1502, the CPU 311 determines whether the IEEE802.1X/EAP setting of the MFP 300 is enabled. The determination processing in step S1502 may be performed based on, for example, setting contents of the "IEEE802.1X/EAP enable/disable" 1131 in the screen 1130 shown in FIG. 11D. If it is determined that the IEEE802.1X/EAP setting is enabled, the process advances to step S1503; otherwise, the process advances to step S1507.

In step S1503, the CPU 311 determines whether the authentication method in the wireless infrastructure mode is the authentication method using the authentication server 500. In other words, this determination processing is processing of determining whether the executed wireless access point search is a search for an access point supporting the authentication method using the authentication server 500 or a search for an access point supporting the authentication method not using the authentication server 500. The determination processing in step S1503 may be performed based on, for example, contents stored in step S1306 or S1308. If the authentication method using the authentication server 500 is determined, the process advances to step S1504; otherwise, the process advances to step S1507. Note that the authentication method using the authentication server 500 is the IEEE802.1X/EAP authentication method, and the authentication method not using the authentication server 500 is the authentication method other than the IEEE802.1X/EAP authentication method.

In step S1504, the CPU 311 determines whether the IEEE802.1X/EAP authentication method is either the EAP-TLS method or the EAP-TTLS method, or is neither the EAP-TLS method nor the EAP-TTLS method. The determination processing in step S1504 may be performed based on, for example, contents set in the screen 1230 shown in FIG. 12D. If it is determined that the authentication method is either the EAP-TLS method or the EAP-TTLS method, the process advances to step S1505; otherwise, the process advances to step S1507. Note that the case in which the authentication method is neither the EAP-TLS method nor the EAP-TTLS method corresponds to a case in which the authentication method is the PEAP method. This processing is executed because the load of the EAP-TLS or EAP-TTLS authentication processing is generally larger than that of the PEAP authentication processing.

In step S1505, the CPU 311 determines whether the length of the encryption key of the public key algorithm used in IEEE802.1X/EAP authentication is equal to or longer than the first threshold. If it is determined that the length of the encryption key is equal to or longer than the first threshold, the process advances to step S1506; otherwise, the process advances to step S1507. The first threshold is set to, for example, 1,024 bits. If the first threshold is set to 1,024 bits, for example, if RSA encryption in which the length of the encryption key is 1,024 bits or 2,048 bits is used as a public key algorithm, the process advances to step S1506. On the other hand, if ECC (Elliptic Curve Cryptography) encryption in which the length of the encryption key is 256 bits is used as a public key algorithm, the process advances to step S1507.

In step S1506, if the power mode of the MFP 300 is the power saving mode, the communication control unit 318 transmits, to the power mode control unit 325, a request to switch the power mode from the power saving mode to the normal power mode. Then, the power mode control unit 325 changes the power mode to the normal power mode, and changes the operating frequency of the CPU 311, the communication control unit 318, or the communication unit 322 to the operating frequency in the normal power mode. After step S1506, the CPU 311 executes, in step S1507, processing for connecting to the access point 400. In the processing for connecting to the access point 400, authentication processing by the access point 400 is performed. If it is determined that any one of the conditions in steps S1502 to S1505 is not satisfied, the processing for connecting to the access point 400 is executed in step S1507 while operating in the power saving mode without changing the operating frequency (that is, without shifting to the normal power mode).

As described above, according to this embodiment, when executing connection to the access point 400 of the authentication method using the authentication server 500, the MFP 300 can dynamically change the operating frequency. More specifically, the MFP 300 controls whether to return the power mode to the normal power mode, in accordance with whether the executed wireless access point is a search for an access point supporting the authentication method using the authentication server 500 or a search for an access point supporting the authentication method not using the authentication server 500. More specifically, the MFP 300 controls whether to return the power mode to the normal power mode, in accordance with whether the authentication method using the authentication server S0) is either the EAP-TLS method or the EAP-TTLS mode. More specifically, the MFP 300 controls whether to return the power mode to the normal power mode, in accordance with whether the public key algorithm used for the authentication method using the authentication server 500 is equal to or larger than a threshold.

Note that in FIG. 15, the four conditions in steps S1502, S1503, S1504, and S1505 are determined as the condition for shifting from the power saving mode to the normal power mode. However, all the conditions need not always be determined. For example, only some of the above-described conditions may be determined. For example, as the condition for shifting from the power saving mode to the normal power mode, only determination processes in steps S1502 and S1503 may be executed and the determination processes in steps S1504 and S1505 need not be executed. In this case, if YES is determined in step S1503, the process advances to step S1506. Alternatively, by determining other contents, whether to shift from the power saving mode to the normal power mode may be controlled. For example, the determination processing in step S1503 may be performed by determining whether the connection target access point is an access point supporting the authentication method using the authentication server 500. Then, control may be executed to shift from the power saving mode to the normal power mode if it is determined that the connection target access point is an access point supporting the authentication method using the authentication server 500, and not to shift from the power saving mode to the normal power mode if the connection target access point is not an access point supporting the authentication method using the authentication server 500.

Second Embodiment

In the second embodiment, the difference from the first embodiment will be described below. The first embodiment has explained the arrangement for appropriately switching the power mode of the MFP 300 when connecting the MFP 300 to the access point 400 of the authentication method using the authentication server 500. This embodiment will describe an arrangement for appropriately switching the power mode of an MFP 300 when authentication by an authenticator is started.

In a communication system 100 according to this embodiment, an authentication apparatus 400 (authenticator) is used instead of the access point 400 shown in FIG. 1, and an authentication server 500 is a RADIUS server. That is, the authentication apparatus 400 includes an L2 switch and hub in addition to a router.

Figure 16:
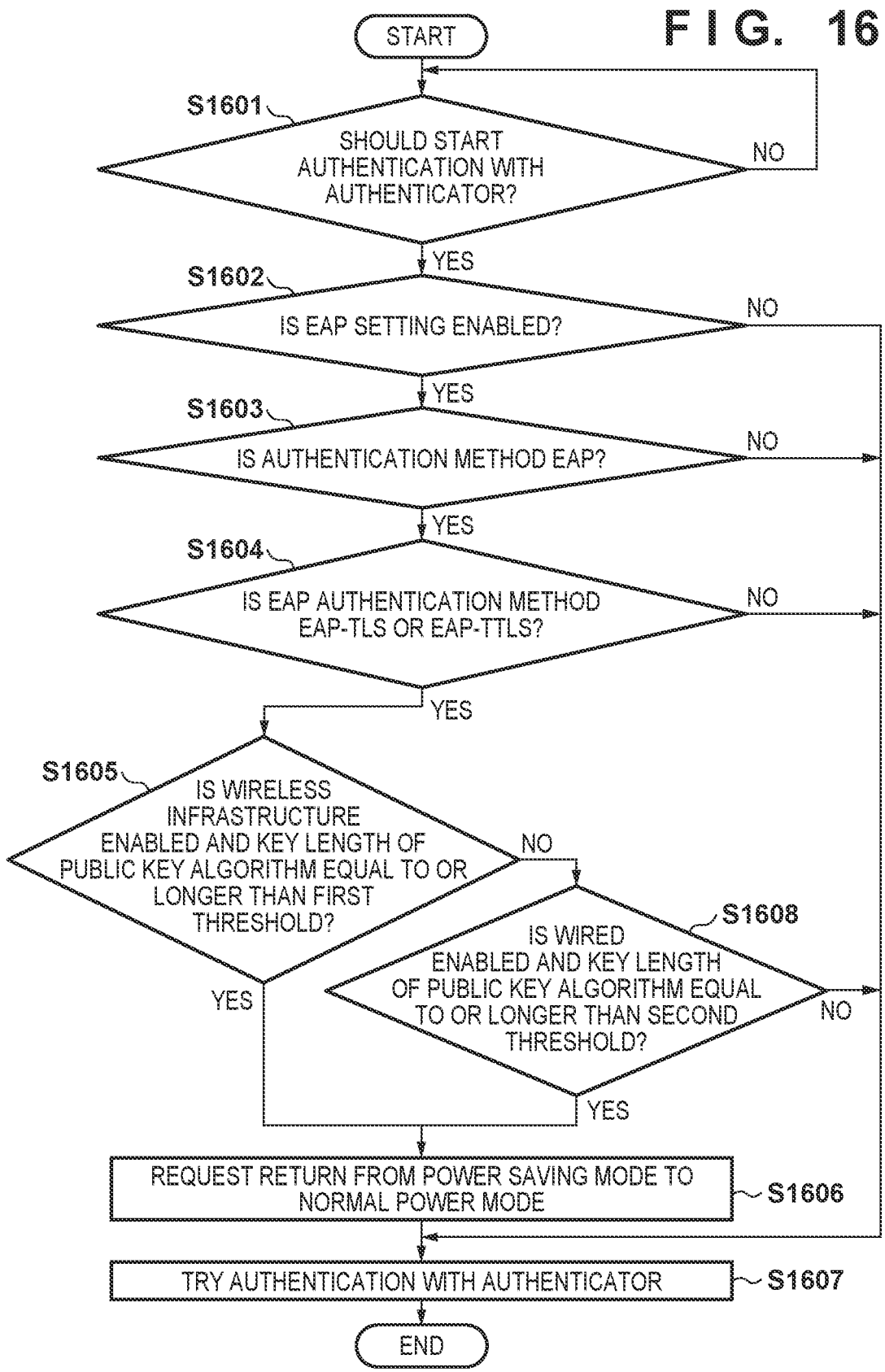
FIG. 16 is a flowchart illustrating processing of changing the operating frequency of the MFP.

FIG. 16 is a flowchart illustrating processing of changing the operating frequency of the MFP 300 when the MFP 300 attempts to execute connection to the authentication apparatus 400. The processing shown in FIG. 16 is implemented when, for example, a CPU 311 reads out programs stored in a program memory 313 and executes them. The processing shown in FIG. 16 is executed when the communication mode of the MFP 300 is the wireless infrastructure mode or the wired communication mode and the MFP 300 is connected to the authentication apparatus 400. A case in which the MFP 300 is connected to the authentication apparatus 400 includes a case in which the MFP 300 is reconnected after disconnection of communication with the authentication apparatus 400. For example, the processing shown in FIG. 16 is started in a state in which the MFP 300 operates in the power saving mode and in a state in which a connection target access point is specified but the MFP 300 is not connected to the access point and currently executes a wireless access point search for searching for the connection target access point.

In step S1601, the CPU 311 determines whether it is possible to perform authentication processing with the authentication apparatus 400. If the communication mode of the MFP 300 is the wireless infrastructure mode, it may be determined whether it is possible to perform authentication processing, based on the fact that the MFP 300 sends an apparatus search request and receives an apparatus search response from the authentication apparatus 400. If the communication mode of the MFP 300 is the wired communication mode, the determination processing may be performed based on the fact that a communicable state is set by connecting the MFP 300 and the authentication apparatus 400 by a LAN cable. If it is determined that it is possible to perform authentication processing with the authentication apparatus 400, the process advances to step S1602; otherwise, the determination processing is repeated until it becomes possible to perform authentication processing with the authentication apparatus 400.

Steps S1602 to S1604 are the same as steps S1502 to S1504, respectively, and a description thereof will be omitted.

In step S1605, the CPU 311 determines whether the communication mode of the MFP 300 is the wireless infrastructure mode and the length of the encryption key of the public key algorithm used in IEEE802.1X/EAP authentication is equal to or longer than the first threshold. If it is determined that the length of the encryption key is equal to or longer than the first threshold, the process advances to step S1606; otherwise, the process advances to step S1608.

In step S1608, the CPU 311 determines whether the communication mode of the MFP 300 is the wired infrastructure mode and the length of the encryption key of the public key algorithm used in IEEE802.1X/EAP authentication is equal to or longer than the second threshold equal to or larger than the first threshold. If it is determined that the length of the encryption key is equal to or longer than the second threshold, the process advances to step S1606; otherwise, the process advances to step S1607.

The first threshold is set to, for example, 1,024 bits. If the first threshold is set to 1,024 bits, for example, if RSA encryption in which the length of the encryption key is 1,024 bits or 2,048 bits is used as a public key algorithm, the process advances to step S1606. On the other hand, if ECC encryption in which the length of the encryption key is 256 bits is used as a public key algorithm, the process advances to step S1607. The second threshold is set to, for example, 4,096 bits. If the second threshold is set to 4,096 bits, for example, if RSA encryption in which the length of the encryption key is 4,096 bits is used as a public key algorithm, the process advances to step S1606. On the other hand, if RSA encryption in which the length of the encryption key is 1,024 bits or 2,048 bits is used as a public key algorithm, the process advances to step S1607.

In step S1606, if the power mode of the MFP 300 is the power saving mode, a communication control unit 318 transmits, to a power mode control unit 325, a request to switch the power mode from the power saving mode to the normal power mode. Then, the power mode control unit 325 changes the power mode to the normal power mode, and changes the operating frequency of the CPU 311, the communication control unit 318, or a communication unit 322 to the operating frequency in the normal power mode. After step S1606, authentication processing by the authentication apparatus 400 is executed in step S1607. If it is determined that any one of the conditions in steps S1602 to S1604 and S1608 is not satisfied, the authentication processing by the authentication apparatus 400 is executed in step S1607 while operating in the power saving mode without changing the operating frequency (that is, without shifting to the normal power mode).

As described above, according to this embodiment, when authentication by the authentication apparatus 400 of the authentication method using the RADIUS server 500 is started, the MFP 300 can dynamically change the operating frequency.

Note that in FIG. 16, the four conditions in steps S1602, S1603, S1604, and S1605 are determined as the condition for shifting from the power saving mode to the normal power mode. However, all the conditions need not always be determined. For example, only some of the above-described conditions may be determined. For example, as the condition for shifting from the power saving mode to the normal power mode, only determination processes in steps S1602 and S1603 may be executed and the determination processes in steps S1604 and S1605 need not be executed. In this case, if YES is determined in step S1603, the process advances to step S1606. Alternatively, by determining other contents, whether to shift from the power saving mode to the normal power mode may be controlled.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)T™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-161968, filed Sep. 30, 2021, which is hereby incorporated by reference herein in its entirety.

What is claimed is:

1. A communication apparatus comprising:
at least one memory storing instructions; and
a processor that executes the stored instructions to function as:
  a search unit configured to execute, based on disconnection of a connection between the communication apparatus and a predetermined external apparatus which supports authentication processing by a predetermined authentication method using an authentication server that is provided outside the communication apparatus and is provided outside the predetermined external apparatus, a search process for searching for the predetermined external apparatus to which the communication apparatus was connected,
  a shift unit configured to shift,
    based on a fact that a predetermined condition in which the predetermined external apparatus is discovered by the search process is satisfied in a state in which the communication apparatus operates in a first state in which the processor of the communication apparatus operates at a first operating frequency and in which the connection between the communication apparatus and the predetermined external apparatus is not established,
    the state of the communication apparatus to a second state in which the processor of the communication apparatus operates at a second operating frequency higher than the first operating frequency;
  an authentication unit configured to execute, after the predetermined condition is satisfied, the authentication processing by the predetermined authentication method via the predetermined external apparatus discovered by the search process in the state in which the communication apparatus operates in the second state; and
  an establishment unit configured to establish again, after the predetermined condition is satisfied, the connection between the communication apparatus and the predetermined external apparatus discovered by the search process.

2. The apparatus according to claim 1, wherein the first state is a state in which power is supplied to the first number of units of the communication apparatus, and the second state is a state in which power is supplied to the second number, larger than the first number, of units of the communication apparatus.

3. The apparatus according to claim 1, wherein the first state is a state in which a first clock is supplied to the processor of the communication apparatus, and the second state is a state in which a second clock faster than the first clock is supplied to the processor of the communication apparatus.

4. The apparatus according to claim 1, wherein the first state is a state in which no power is supplied to a printing unit of the communication apparatus, and the second state is a state in which power is supplied to the printing unit of the communication apparatus.

5. The apparatus according to claim 1, wherein the authentication processing by the predetermined authentication method is authentication processing complying with the IEEE802.1X standard.

6. The apparatus according to claim 5, wherein
the state of the communication apparatus is shifted to the second state based on a fact that the predetermined external apparatus supporting authentication processing by a first authentication method as the authentication processing complying with the IEEE802.1X standard is discovered by the search process in the state in which the communication apparatus operates in the first state, and
the authentication processing by the predetermined authentication method is executed via the predetermined external apparatus in the state in which the communication apparatus operates in the first state without shifting the state of the communication apparatus to the second state based on a fact that the predetermined external apparatus supporting authentication processing by a second authentication method different from the first authentication method as the authentication processing complying with the IEEE802.1X standard is discovered by the search process in the state in which the communication apparatus operates in the first state.

7. The apparatus according to claim 6, wherein
the first authentication method is one of an EAP-TLS (EAP-Transport Layer Security) method and an EAP-TTLS (EAP-Tunneled TLS) method, and
the second authentication method is a PEAP (Protected EAP) method.

8. The apparatus according to claim 1, wherein
another search process for searching another predetermined external apparatus to which the communication apparatus was connected is executed based on disconnection of a connection between the communication apparatus and the another predetermined external apparatus which supports authentication processing by an authentication method different from the predetermined authentication method,
the authentication processing by the authentication method different from the predetermined authentication method is executed via the another predetermined external apparatus in the state in which the communication apparatus operates in the first state without shifting the state of the communication apparatus to the second state based on a fact that the another predetermined external apparatus is discovered by the another search process in the state in which the communication apparatus operates in the first state.

9. The apparatus according to claim 8, wherein the authentication method different from the predetermined authentication method is an authentication method not using the authentication server.

10. The apparatus according to claim 1, wherein
the processor of the communication apparatus is shifted to the second state in which the processor operates at the second operating frequency, based on a fact that the predetermined external apparatus supporting authentication processing using an encryption key of a first length by the predetermined authentication method is discovered by the search process in the state in which the communication apparatus operates in the first state, and the authentication processing by the predetermined authentication method is executed via the predetermined external apparatus in the state in which the communication apparatus operates in the first state without shifting the state of the communication apparatus to the second state based on a fact that the predetermined external apparatus supporting authentication processing using an encryption key of a second length shorter than the first length by the predetermined authentication method is discovered by the search process in the state in which the communication apparatus operates in the first state.

11. The apparatus according to claim 10, wherein
the encryption key of the first length is one of 1024-bit encryption key and a 2048-bit encryption key, and
the encryption key of the second length is a 256-bit encryption key.

12. The apparatus according to claim 10, wherein
the authentication processing using the encryption key of the first length by the predetermined authentication method is authentication processing using RSA encryption as a public key algorithm, and
the authentication processing using the encryption key of the second length by the predetermined authentication method is authentication processing using ECC (Elliptic Curve Cryptography) encryption as a public key algorithm.

13. The apparatus according to claim 1, wherein the predetermined external apparatus is one of an access point and an authenticator.

14. The apparatus according to claim 1, wherein
the processor of the communication apparatus is shifted to the second state in which the processor operates at the second operating frequency, based on a fact that the predetermined external apparatus supporting authentication processing using an encryption key of a first length by the predetermined authentication method is discovered by the search process in the state in which the communication apparatus operates in the first state,
the authentication by the predetermined authentication method is executed via the predetermined external apparatus in the state in which the communication apparatus operates in the first state without shifting the state of the communication apparatus to the second state based on a fact that the predetermined external apparatus supporting authentication processing using an encryption key of a second length shorter than the first length by the predetermined authentication method is discovered by the search process in the state in which the communication apparatus operates in the first state,
the processor of the communication apparatus is shifted to the second state in which the processor operates at the second operating frequency, based on a fact that wired connection between the communication apparatus and the predetermined external apparatus supporting authentication processing using an encryption key of a third length longer than the first length by the predetermined authentication method is established in the state in which the communication apparatus operates in the first state, and the authentication by the predetermined authentication method is executed via the predetermined external apparatus in the state in which the communication apparatus operates in the first state without shifting the state of the communication apparatus to the second state based on a fact that wired connection between the communication apparatus and the predetermined external apparatus supporting authentication processing using an encryption key of a fourth length shorter than the third length by the predetermined authentication method is established in the state in which the communication apparatus operates in the first state.

15. The apparatus according to claim 14, wherein
the encryption key of the first length is one of a 1024-bit encryption key and a 2048-bit encryption key,
the encryption key of the second length is a 256-bit encryption key,
the encryption key of the third length is a 4096-bit encryption key, and
the encryption key of the fourth length is one of a 1024-bit encryption key and a 2048-bit encryption key.

16. The apparatus according to claim 14, wherein the operating frequency of the processor of the communication apparatus is selectively changed from operating frequencies in several stages.

17. The apparatus according to claim 1, further comprising at least one of a printing unit configured to execute printing and a scanning unit configured to execute a scan.

18. A control method for a communication apparatus, comprising:
executing, based on disconnection of a connection between the communication apparatus and a predetermined external apparatus which supports authentication processing by a predetermined authentication method using an authentication server that is provided outside the communication apparatus and is provided outside the predetermined external apparatus, a search process for searching for the predetermined external apparatus to which the communication apparatus was connected;
shifting,
based on a fact that a predetermined condition in which the predetermined external apparatus is discovered by the search process, is satisfied in a state in which the communication apparatus operates in a first state in which a processor of the communication apparatus operates at a first operating frequency and in which the connection between the communication apparatus and the predetermined external apparatus is not established,
the state of the communication apparatus to a second state in which the processor of the communication apparatus operates at a second operating frequency higher than the first operating frequency;
executing, after the predetermined condition is satisfied, the authentication processing by the predetermined authentication method via the predetermined external apparatus discovered by the search process in the state in which the communication apparatus operates in the second state; and
establishing again, after the predetermined condition is satisfied, the connection between the communication apparatus and the predetermined external apparatus discovered by the search process.

19. A non-transitory computer-readable storage medium storing a program for causing a computer of a communication apparatus to execute:

executing, based on disconnection of a connection between the communication apparatus and a predetermined external apparatus which supports authentication processing by a predetermined authentication method using an authentication server that is provided outside the communication apparatus and is provided outside the predetermined external apparatus, a search process for searching for the predetermined external apparatus to which the communication apparatus was connected;

shifting,
    based on a fact that a predetermined condition in which the predetermined external apparatus is discovered by the search process, is satisfied in a state in which the communication apparatus operates in a first state in which a processor of the communication apparatus operates at a first operating frequency and in which the connection between the communication apparatus and the predetermined external apparatus is not established, the state of the communication apparatus to a second state in which the processor of the communication apparatus operates at a second operating frequency higher than the first operating frequency;

executing, after the predetermined condition is satisfied, the authentication processing by the predetermined authentication method via the predetermined external apparatus discovered by the search process in the state in which the communication apparatus operates in the second state; and establishing again, after the predetermined condition is satisfied, the connection between the communication apparatus and the predetermined external apparatus discovered by the search process.

\* \* \* \* \*